United States Patent
Nagai et al.

(10) Patent No.: US 9,442,014 B2
(45) Date of Patent: Sep. 13, 2016

(54) FOURIER TRANSFORM SPECTROMETER AND FOURIER TRANSFORM SPECTROSCOPIC METHOD

(75) Inventors: Yoshiroh Nagai, Nishinomiya (JP); Toshio Kawano, Sakai (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 14/009,444

(22) PCT Filed: Apr. 2, 2012

(86) PCT No.: PCT/JP2012/002288
§ 371 (c)(1),
(2), (4) Date: Oct. 2, 2013

(87) PCT Pub. No.: WO2012/137470
PCT Pub. Date: Oct. 11, 2012

(65) Prior Publication Data
US 2014/0022546 A1    Jan. 23, 2014

(30) Foreign Application Priority Data
Apr. 5, 2011  (JP) .................. 2011-083769

(51) Int. Cl.
*G01B 9/02*  (2006.01)
*G01J 3/45*  (2006.01)
*G01J 3/02*  (2006.01)
*G01J 3/453* (2006.01)
*G06F 17/14* (2006.01)

(52) U.S. Cl.
CPC .................. *G01J 3/45* (2013.01); *G01J 3/021* (2013.01); *G01J 3/0208* (2013.01); *G01J 3/4535* (2013.01); *G06F 17/14* (2013.01)

(58) Field of Classification Search
CPC .......... G01J 3/45; G01J 3/4535; G01J 3/021; G01J 3/0208; G06F 17/14
USPC ........................................................ 356/451
See application file for complete search history.

(56) References Cited

U.S. PATENT DOCUMENTS

| | | | |
|---|---|---|---|
| 7,535,004 B2 | 5/2009 | Yamamoto | |
| 2003/0234937 A1* | 12/2003 | Akao et al. | 356/491 |
| 2004/0136006 A1 | 7/2004 | Abbink | |
| 2008/0252897 A1* | 10/2008 | Arnvidarson et al. | 356/452 |
| 2009/0024360 A1* | 1/2009 | Arnvidarson | 702/189 |
| 2010/0223015 A1* | 9/2010 | Phillips et al. | 702/24 |

FOREIGN PATENT DOCUMENTS

| | | |
|---|---|---|
| JP | 62038324 A | 2/1987 |
| JP | 0926358 A | 1/1997 |
| JP | 09292282 A | 11/1997 |
| JP | 10090065 A | 4/1998 |
| JP | 2008134133 A | 6/2008 |

OTHER PUBLICATIONS

International Search Report for International Application No. PCT/JP2012/002288; Date of Mailing: May 1, 2012, with English Translation.

* cited by examiner

*Primary Examiner* — Tarifur Chowdhury
*Assistant Examiner* — Jonathon Cook
(74) *Attorney, Agent, or Firm* — Cantor Colburn LLP

(57) ABSTRACT

A Fourier transform spectrometer (Da) of the invention extracts, in generating an integrated interferogram obtained by integrating a plurality of interferograms, an output of an interferometer (11a) within a predetermined range according to positioning information of a center burst in an interferogram measured at a time before measurement of an interferogram at the present time.

11 Claims, 20 Drawing Sheets

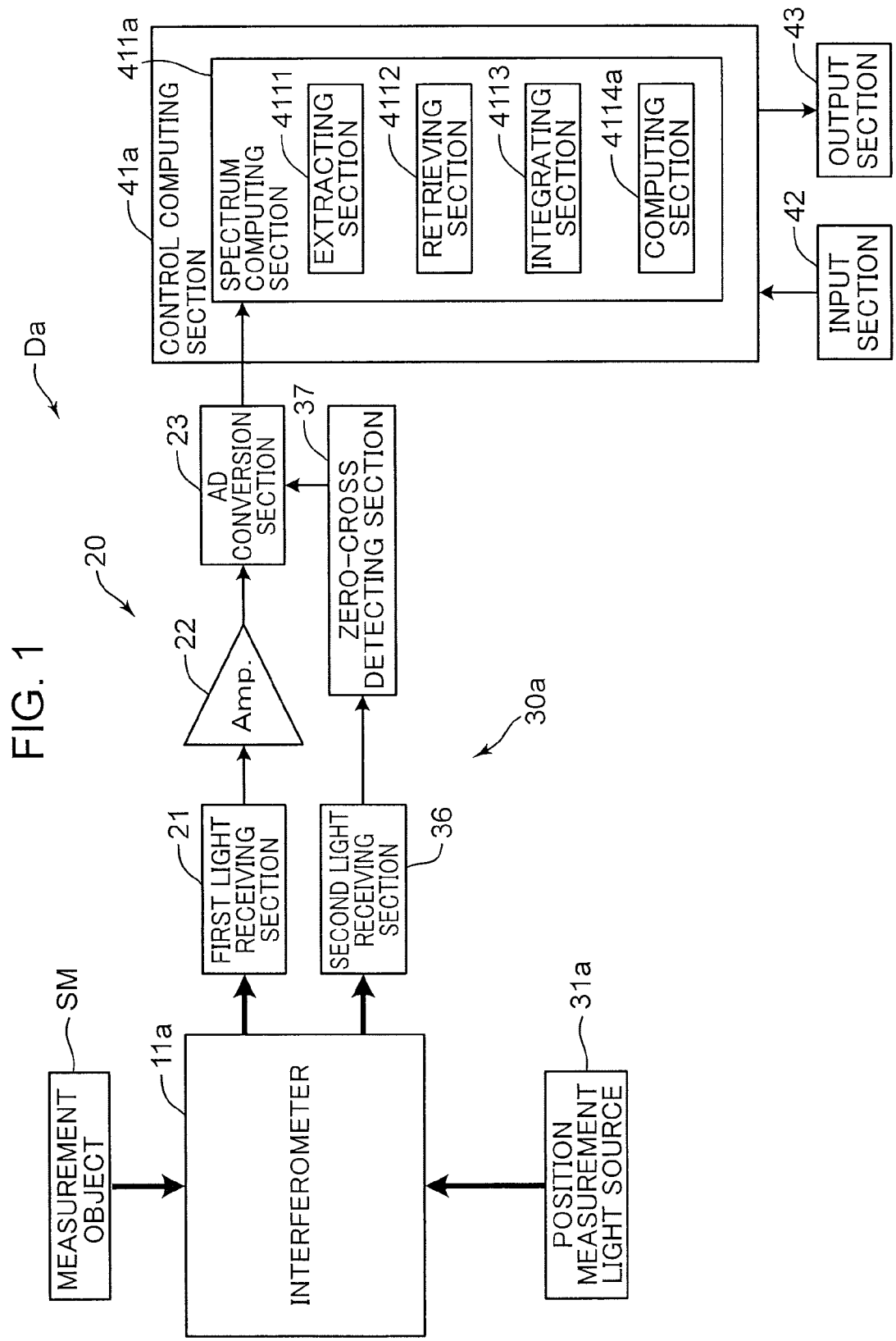

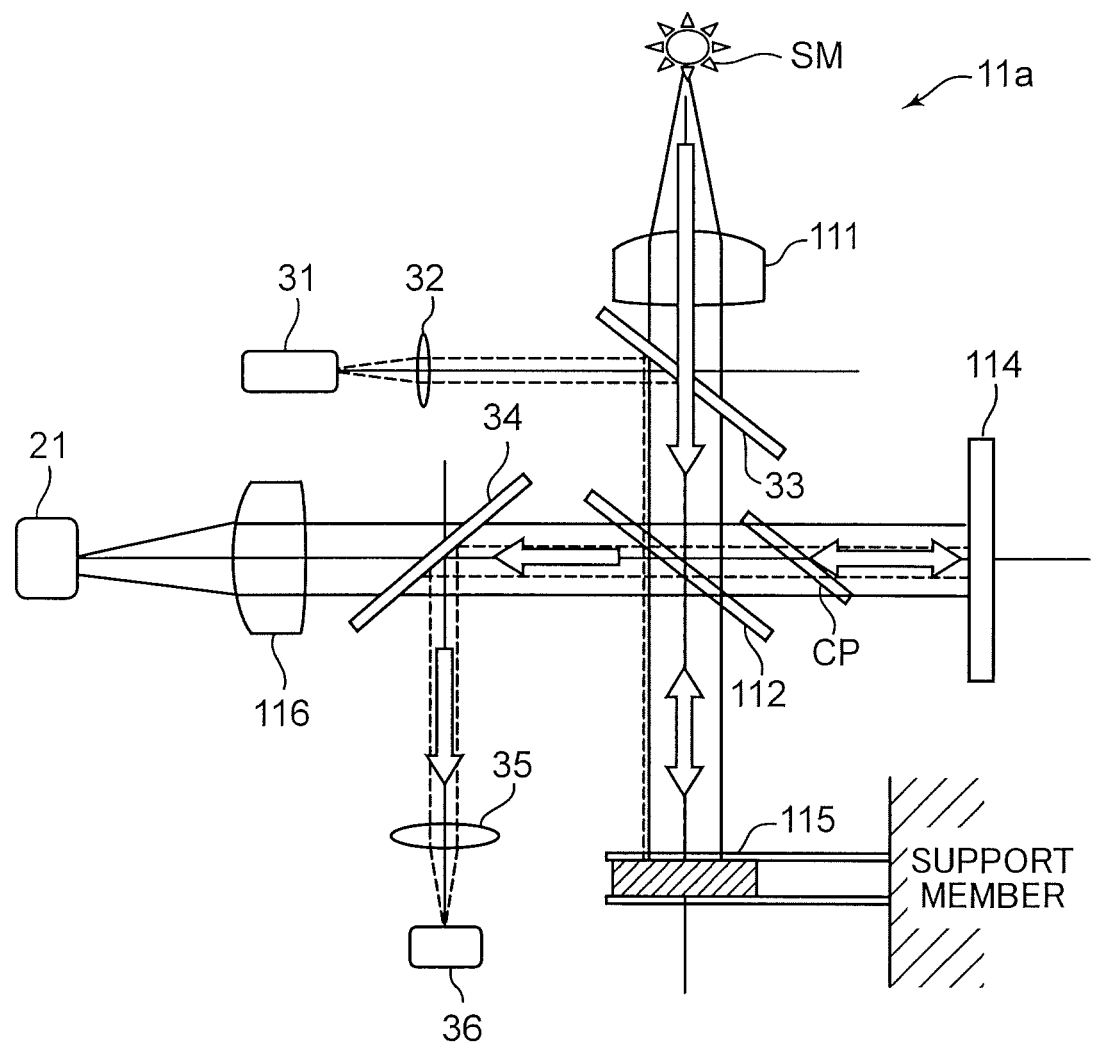

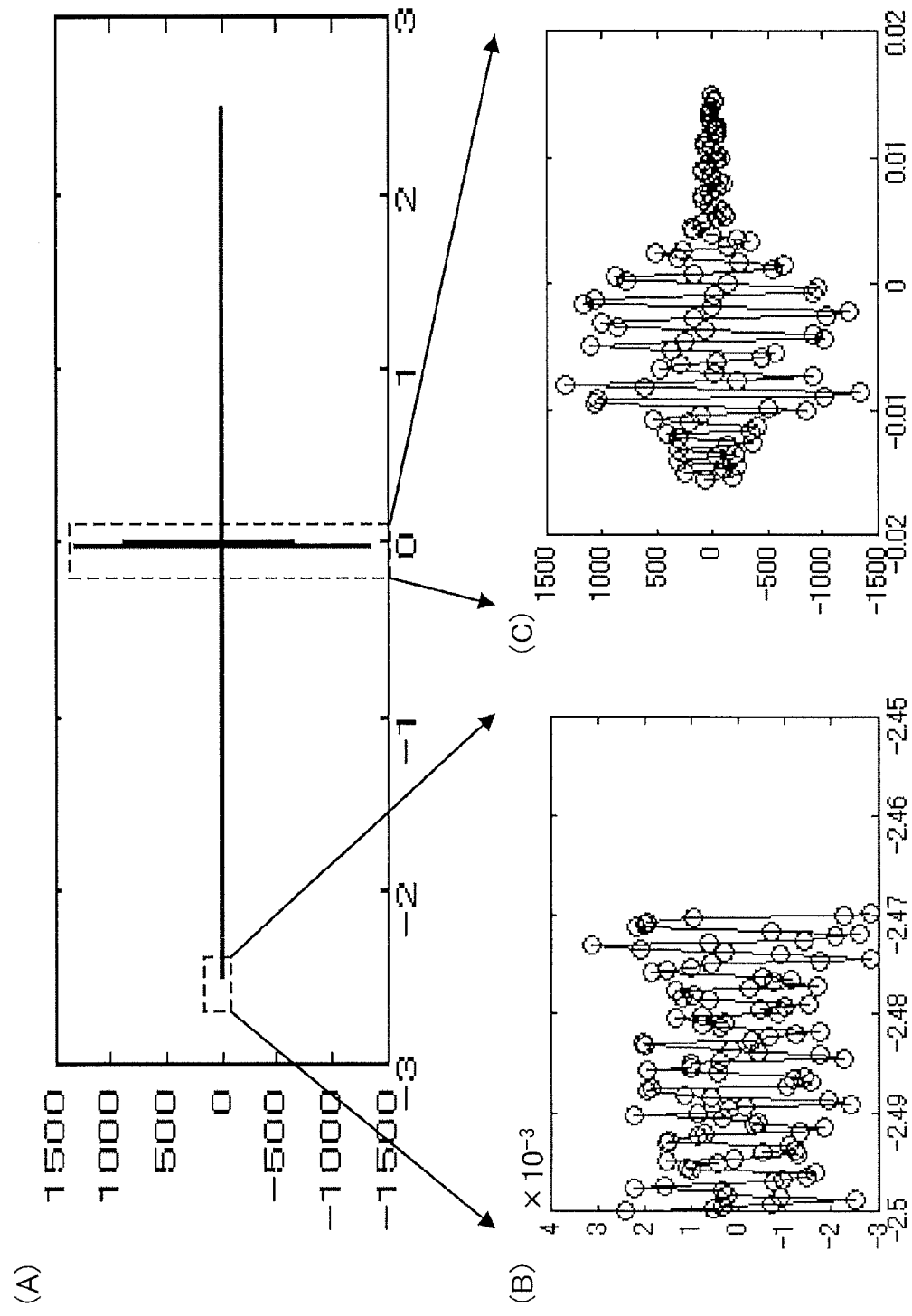

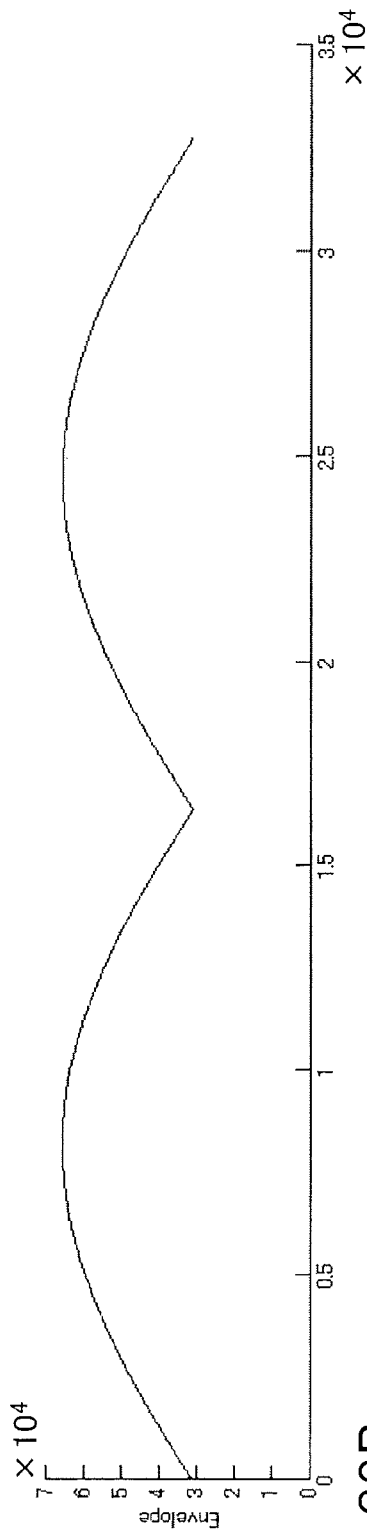
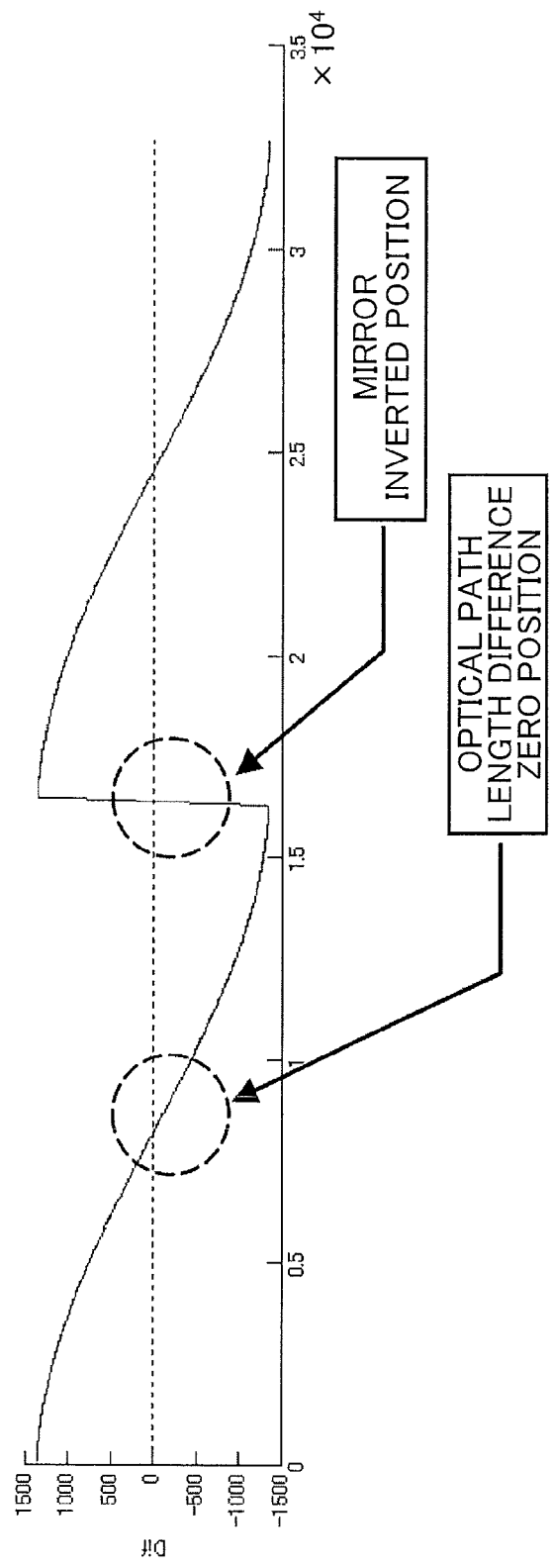
FIG. 20A
FIG. 20B

FOURIER TRANSFORM SPECTROMETER AND FOURIER TRANSFORM SPECTROSCOPIC METHOD

CROSS REFERENCE TO RELATED APPLICATIONS

This is the U.S. national stage of application No. PCT/JP2012/002288, filed on 2 Apr. 2012. Priority under 35 U.S.C. §119(a) and 35 U.S.C. §365(b) is claimed from Japanese Application No. 2011-083769, filed 5 Apr. 2011, the disclosure of which is also incorporated herein by reference.

TECHNICAL FIELD

The present invention relates to a Fourier transform spectrometer and a Fourier transform spectroscopic method, and more particularly to a Fourier transform spectrometer and a Fourier transform spectroscopic method that enable to appropriately integrate interferograms, in the case where the interferograms are integrated for generating an interferogram for use in obtaining a spectrum of measurement light.

BACKGROUND ART

A spectrometer is an apparatus for measuring a spectrum of measurement light to be measured. There is known, as an example of the spectrometer, a Fourier transform spectrometer configured to obtain a spectrum of measurement light by measuring interfering light of the measurement light by an interferometer and by subjecting the measurement result to a Fourier transform.

In the Fourier transform spectrometer, an output of the interferometer is represented by a synthesized waveform, in which light of a plurality of wavelengths included in the measurement light is interfered by the interferometer as a lot. The output is called as an interferogram. A spectrum of measurement light is obtained by subjecting the interferogram to a Fourier transform. The interferogram has such a profile that one or more sharp peaks appear within a predetermined range, and that the output becomes substantially zero level within the remaining range. A center peak out of the one or more sharp peaks is called as a center burst.

In the Fourier transform spectrometer, if a spectrum of measurement light is obtained by subjecting an interferogram obtained by one-time measurement to a Fourier transform, normally, the S/N ratio is poor, and it is difficult to obtain a measurement result with intended precision. In view of the above, in the Fourier transform spectrometer, an interferogram is measured a plurality of times with respect to one measurement object, and the interferograms are integrated for generating an interferogram (hereinafter, called as an integrated interferogram) for use in obtaining a spectrum of measurement light. In the ordinary practice, the plurality of times of measurements are performed while continuously changing the optical path length of one of the two optical paths of the interferometer.

The technique of integrating interferograms is disclosed in patent literature 1 and in patent literature 2, for instance. The interferogram integrating device disclosed in patent literature 1 is an interferogram integrating device which integrates unit interferograms to be obtained by irradiating a measurement object with interfering light of one scan. The interferogram integrating device is provided with unit interferogram storing means which temporarily stores the unit interferograms, maximum position detecting means which detects a center burst position, based on unit interferogram data stored in the unit interferogram storing means, cutting means which cuts a predetermined amount of unit interferogram at both ends of the unit interferogram on a positional axis of the unit interferogram, with respect to the center burst position of unit interferogram detected by the maximum position detecting means as a reference so as to extract a cut interferogram, and integrating means which integrates a plurality of the cut interferograms successively obtained in correspondence to the unit interferograms.

Further, in patent literature 2, a measurement light interferogram generated by transmitting measurement light through a measurement object, and a reference light interferogram generated by allowing reference light to bypass the measurement object are synchronously measured. There is computed a phase difference at which the phase of a reference light interferogram in a present measurement period maximally coincides with the reference light interferogram stored in advance as a reference in a reference waveform storage. Then, an average of the measurement light interferogram and the reference light interferogram is obtained by performing synchronous addition with respect to the computed phase difference.

In the case of integrating interferograms as described above, it is necessary to sum up measurement data having the same optical path length difference as each other with respect to each of the interferograms. For the summation, measurement data within a range including a center burst is extracted from a plurality of measurement data (measurement data at the respective sampling points) obtained by one-time measurement, and then, measurement data having the same optical path length difference as each other is retrieved. Thereafter, the measurement data having the same optical path length difference as each other are summed up.

In the case of using a light reflecting mechanism for moving a reflection surface in a direction perpendicular to the reflection surface by resonant vibration in order to change the optical path length of the interferometer, for instance, intrusion of noise e.g. external vibration may vary the amplitude of the reflection surface resulting from an influence of the noise (such as external vibration). As a result, in the case where measurement data is extracted a plurality of times of measurements within a certain range, in some cases, a center burst may not be included in the extracted measurement data within the range. In such a case, it is impossible to perform positioning of the interferograms, and it is impossible to integrate the interferograms over the entirety of each of the optical path length differences.

CITATION LIST

Patent Literature

Patent literature 1: JP Hei 09-026358A
Patent literature 2: JP Hei 09-292282A

SUMMARY OF INVENTION

In view of the above, an object of the invention is to provide a Fourier transform spectrometer and a Fourier transform spectroscopic method that enable to appropriately integrate a plurality of interferograms by appropriately extracting measurement data within a range including the interferograms.

A Fourier transform spectrometer and a Fourier transform spectroscopic method of the invention obtain a spectrum of measurement light by subjecting an integrated interferogram obtained by integrating a plurality of interferograms of the measurement light generated by an interferometer to a Fourier transform. In extracting an output within a predetermined range from an output of the interferometer, the predetermined range to be extracted is set according to positioning information of a center burst in an interferogram of the measurement light measured at a time before measurement of an interferogram of the measurement light at the present time. According to the Fourier transform spectrometer and the Fourier transform spectroscopic method having the above configuration, it is possible to appropriately extract measurement data within a range which completely covers the entirety of the interferograms, because the positioning information obtained at a time before the present measurement is included. This is advantageous in appropriately integrating the interferograms.

These and other objects, features and advantages of the present invention will become more apparent upon reading the following detailed description along with the accompanying drawings.

BRIEF DESCRIPTION OF DRAWINGS

FIG. 1 is a block diagram showing a configuration of a Fourier transform spectrometer according to a first embodiment;

FIG. 2 is a diagram mainly showing a configuration of an interferometer in the Fourier transform spectrometer according to the first embodiment;

FIG. 15 is diagrams showing an example of a waveform (interferogram) of interfering light of actually measured measurement light in the Fourier transform spectrometer according to the second embodiment;

FIGS. 20A and 20B are diagrams for describing a method for obtaining a center burst position, based on an envelope curve of interfering light of laser light according to a second aspect.

DESCRIPTION OF EMBODIMENTS

Figure 3A:
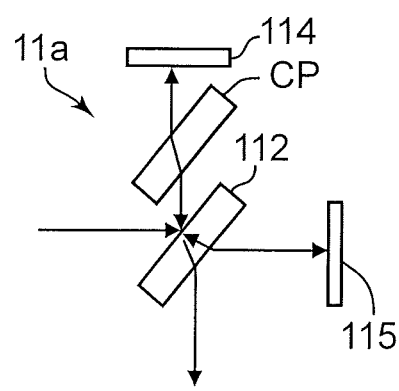
FIGS. 3A, 3B, 3C, and 3D are diagrams for describing a configuration of an interferometer, an interferometer without a phase compensation plate CP, a waveform (interferogram) of interfering light of measurement light, and a waveform of interfering light of laser light from a position measurement light source in the Fourier transform spectrometer according to the first embodiment.

Hereinafter, embodiments of the invention are described referring to the drawings. Elements identified by the same reference numerals in the drawings are the same elements and are not repeatedly described unless necessary.

(First Embodiment)

FIG. 1 is a block diagram showing a configuration of a Fourier transform spectrometer according to the first embodiment. FIG. 2 is a diagram mainly showing a configuration of an interferometer in the Fourier transform spectrometer according to the first embodiment.

A Fourier transform spectrometer Da according to the first embodiment is an apparatus for measuring a spectrum of measurement light to be measured, and is an apparatus for obtaining a spectrum of measurement light by measuring the measurement light by an interferometer, and by subjecting a waveform (interferogram) of interfering light of the measured measurement light to a Fourier transform. In the Fourier transform spectrometer Da of the embodiment, in order to improve the S/N ratio and to obtain a result with intended precision, there is used an integrated interferogram obtained by integrating interferograms of the measurement light generated by the interferometer, as an object to be subjected to a Fourier transform, in order to obtain a spectrum of the measurement light. As shown in FIG. 1 and FIG. 2, for instance, the Fourier transform spectrometer Da is provided with an interferometer $11a$ to which light (measurement light) radiated from a measurement object SM is incident for outputting interfering light of the measurement light, a light receiving processing section 20 which receives the interfering light of the measurement light obtained by the interferometer 11a and outputs an electrical signal (electrical signal representing a light intensity change of the interfering light of the measurement light) of a waveform of the interfering light of the measurement light by photoelectric conversion, a position detection processing section 30a which detects a position of a movable mirror 115 of the interferometer 11a, a control computing section 41a, an input section 42, and an output section 43. The measurement object SM may be a light source which emits light by itself, or may be an object to which light is emitted from another light source, and which radiates light by reflection, transmission, or re-radiation (e.g. fluorescent emission) of the emitted light.

The interferometer 11a allows incidence of measurement light to be measured, separates the incident measurement light into first measurement light and second measurement light, propagates the first measurement light and the second measurement light respectively along a first optical path and a second optical path different from each other, and merges the first measurement light and the second measurement light. In the case where there is an optical path length difference between the first and second optical paths from the separation point (separation position) of the measurement light to the merging point (merging position or interfering position) of the measurement light, an interference fringe is generated by the merging, because a phase difference is generated at the time of merging. A variety of types of interferometers equipped with first and second optical paths such as a Mach-Zehnder interferometer may be used as the interferometer 11a. In this embodiment, as shown in FIG. 2, the interferometer 11a is constituted of a Michelson interferometer.

More specifically, as shown in FIG. 2, the interferometer 11a is provided with, as optical elements, a semitransparent mirror 112, a fixed mirror 114, and the movable mirror 115 whose light reflection surface is moved in the optical axis direction. The fixed mirror 114 and the movable mirror 115 are respectively disposed at such positions that normal lines to the mirror surfaces of the fixed mirror 114 and the movable mirror 115 are orthogonal to each other. The semitransparent mirror 112 is disposed at such a position that the normal line thereof passes a point at which the normal lines to the fixed mirror 114 and the movable mirror 115 intersect orthogonal to each other, and that the normal line thereof intersects with the normal lines at an angle of 45 degrees. In the thus configured interferometer 11a, measurement light incident to the interferometer 11a is separated into first measurement light and second measurement light on the semitransparent mirror 112. The first measurement light is reflected on the semitransparent mirror 112 and is incident to the fixed mirror 114. After the first measurement light is reflected on the fixed mirror 114, the first measurement light travels backward to the semitransparent mirror 112 along the incoming optical path. On the other hand, the second measurement light is incident to the movable mirror 115 through the semitransparent mirror 112. After the second measurement light is reflected on the movable mirror 115, the second measurement light travels backward to the semitransparent mirror 112 along the incoming optical path. The first measurement light reflected on the fixed mirror 114, and the second measurement light reflected on the movable mirror 115 merge and interfere with each other on the semitransparent mirror 112. In the thus configured Michelson interferometer 11a, measurement light is incident to the interferometer 11 a along the direction of normal line to the mirror surface of the movable mirror 115, and interfering light of the measurement light is output from the interferometer 11a along the direction of normal line to the mirror surface of the fixed mirror 114.

In this embodiment, in the case where the interferometer 11a is of such a type as to separate measurement light into first measurement light and second measurement light on the semitransparent mirror 112, the interferometer 11a is further provided with a phase compensation plate CP disposed on the reflection side of the semitransparent mirror 112. Specifically, in this embodiment, first measurement light reflected on the semitransparent mirror 112 is incident to the fixed mirror 114 via the phase compensation plate CP. After the first measurement light is reflected on the fixed mirror 114, the first measurement light is incident to the semitransparent mirror 112 via the phase compensation plate CP. The phase compensation plate CP cancels out and compensates for the phase difference between the first measurement light and the second measurement light, resulting from a difference between the number of times of transmitting the first measurement light through the semitransparent mirror 112, and the number of times of transmitting the second measurement light through the semitransparent mirror 112. The phase compensation plate CP is a phase plate having an isotropy, and generates a phase shift in light propagating through the phase compensation plate CP with respect to the phase of light propagating in vacuo or in the air by the distance equal to the thickness of the phase compensation plate CP. The phase compensation plate CP will be described later in detail.

The first measurement light travels along the first optical path from the incident position of measurement light as described above to the semitransparent mirror 112 via the semitransparent mirror 112, the phase compensation plate CP, the fixed mirror 114, and the phase compensation plate CP in this order. The second measurement light travels along the second optical path from the incident position of measurement light as described above to the semitransparent mirror 112 via the semitransparent mirror 112 and the movable mirror 115 in this order.

The movable mirror 115 is an example of an optical path length difference forming optical element, and is an optical element which generates an optical path length difference between the first and second optical paths by using resonant vibration. An example of the movable mirror 115 is a light reflecting mechanism disclosed in the pamphlet of International Unexamined Patent Publication No. WO2010/122879. The light reflecting mechanism is provided with a first moving portion having a reflection surface on a surface thereof, a support portion which supports the first moving portion, a first beam and a parallel moving beam which interconnect between the first moving portion and the support portion above and beneath the support portion by a cantilever system, and a driving portion which moves the first moving portion for resonantly vibrating the first moving portion in a direction perpendicular to the reflection surface. The light reflecting mechanism is manufactured by MEMS (Micro Electro Mechanical Systems).

Preferably, as shown in FIG. 2, the movable mirror 115 may be configured such that the reflection surface thereof translationally moves, with use of a parallel plate spring. The movable mirror 115 having such a parallel plate spring structure is provided with an unillustrated actuator which exerts a driving force for moving the mirror surface by an external driving source, and a drive signal operable to resonate the reflection surface (mirror surface) is supplied to the actuator. Regarding the movable mirror 115 utilizing such translational movement by the parallel plate spring structure, the position of the movable mirror 115 in an inoperative state (stationary state) is set as the center of movement (vibration), which serves as a reference position in a stationary state. Accordingly, the above position of the movable mirror 115 serves as a reference position of an optical path length on the movable mirror 115 side. Thus, the position of the reflection surface in a stationary state of the parallel plate spring serves as a reference of the optical path length on the movable mirror 115 side "in the case where the optical elements are disposed at such a position that the optical path length difference between the optical path length on the fixed mirror 114 side, and the optical path length on the movable mirror 115 side becomes zero (0), assuming that the optical paths are made of a same medium".

Further, in this embodiment, for instance, a biconvex collimator lens 111 as an incident optical system is disposed at an appropriate position between the measurement object SM and the semitransparent mirror 112 in order to allow incidence of measurement light radiated from the measurement object SM to the semitransparent mirror 112 as parallel light, and a biconvex light collecting lens 116 as an exit optical system is disposed at an appropriate position between the semitransparent mirror 112 and a first light receiving section 21 in order to collect interfering light of measurement light generated by merging and interfering the first measurement light and the second measurement light on the semitransparent mirror 112, and to allow incidence of the collected light to the first light receiving section 21.

Referring back to FIG. 1, the light receiving processing section 20 is, for instance, provided with the first light receiving section 21, an amplifying section 22, and an analog-to-digital conversion section (hereinafter, called as "AD conversion section") 23. The first light receiving section 21 is a circuit which outputs an electrical signal according to a light intensity of interfering light of measurement light by receiving the interfering light of the measurement light obtained by the interferometer 11a and by photoelectrically converting the received light. The first light receiving section 21 is, for instance, an infrared sensor constituted of an InGaAs photodiode and peripheral circuits thereof The amplifying section 22 is an amplifier which amplifies an output from the first light receiving section 21 with a predetermined gain. The AD conversion section 23 is a circuit which converts (AD converts) an output from the amplifying section 22 from an analog signal to a digital signal. The timing (sampling timing) of AD conversion is executed at a zero-cross timing input from a zero-cross detecting section 37 to be described later.

Further, the position detection processing section 30a is, for instance, provided with a position measurement light source 31a, a second light receiving section 36, and the zero-cross detecting section 37. As shown in FIG. 2, the position detection processing section 30a is further provided with a collimator lens 32, a beam splitter 33, a beam splitter 34, and a light collecting lens 35 in order to obtain interfering light of laser light emitted from the position measurement light source 31a with use of the interferometer 11a.

The position measurement light source 31a is a light source device which emits monochromatic laser light. Referring to FIG. 2, the collimator lens 32 and the beam splitter 33 constitute an incident optical system for allowing incidence of laser light emitted from a position measurement light source 31 to the interferometer 11a as parallel light. The beam splitter 33 is disposed between the collimator lens 111 and the semitransparent mirror 112 in such a manner that the normal line to the beam splitter 33 intersects with the normal line to the movable mirror 115 at an angle of 45 degrees. The collimator lens 32 is, for instance, a biconvex lens, and is disposed at an appropriate position so that laser light emitted from the position measurement light source 31a is incident to the beam splitter 33 disposed as above at an incident angle of 45 degrees. The beam splitter 34 and the light collecting lens 35 constitute an exit optical system for extracting interfering light of the laser light generated by the interferometer 11a from the interferometer 11a. The beam splitter 34 is disposed between the semitransparent mirror 112 and the light collecting lens 116 in such a manner that the normal line to the beam splitter 34 intersects with the normal line (optical axis) to the fixed mirror 114 at an angle of 45 degrees. The light collecting lens 35 is, for instance, a biconvex lens, and collects interfering light of laser light output from the beam splitter 34 disposed as above at an exit angle of 45 degrees, and allows incidence of the collected light to the second light receiving section 36. The beam splitter 33 may be a dichroic mirror which reflects laser light while transmitting measurement light. The beam splitter 34 may be a dichroic mirror which reflects interfering light of laser light while transmitting interfering light of measurement light.

Disposing the collimator lens 32, the beam splitters 33 and 34, and the light collecting lens 35 as the optical elements as described above makes it possible to convert monochromatic laser light emitted from the position measurement light source 31a into parallel light by the collimator lens 32. Then, the optical path of the laser light is bent by the beam splitter 33 at an angle of about 90 degrees, and the laser light propagates along the optical axis of the interferometer 11a (in the direction of normal line to the mirror surface of the movable mirror 115). Accordingly, similarly to the measurement light, the laser light generates interfering light in the interferometer 11a, while propagating through the interferometer 11a. The interfering light of the laser light is bent by the beam splitter 34 at an angle of about 90 degrees, is extracted from the interferometer 11a, is collected on the light collecting lens 35, and is received on the second light receiving section 36.

Referring back to FIG. 1, the second light receiving section 36 is a circuit which outputs an electrical signal according to a light intensity of interfering light of laser light by receiving the interfering light of the laser light obtained by the interferometer 11a, and by photoelectrically converting the received light. The second light receiving section 36 is, for instance, a light receiving sensor constituted of a silicon photodiode (SPD) and peripheral circuits thereof The second light receiving section 36 outputs the electrical signal according to the light intensity of the interfering light of the laser light to the zero-cross detecting section 37.

The zero-cross detecting section 37 is a circuit which detects a timing at which an electrical signal according to a light intensity of interfering light of laser light input from the second light receiving section 36 becomes zero. In the case where the movable mirror 115 of the interferometer 11a is moved in the optical axis direction, the phase of laser light which travels from the semitransparent mirror 112 and returns to the semitransparent mirror 112 via the movable mirror 115 is shifted from the phase of laser light which travels from the semitransparent mirror 112 and returns to the semitransparent mirror 112 via the fixed mirror 114. Accordingly, the interfering light of the laser light sinusoidally varies according to the moving amount of the movable mirror 115. If the movable mirror 115 of the interferometer 11a is moved by the distance corresponding to the length of ½ of the wavelength of laser light, the phase of laser light which travels from the semitransparent mirror 112 and returns to the semitransparent mirror 112 via the movable mirror 115 is shifted by $2\pi$ before and after the movement of the movable mirror 115. Accordingly, the interfering light of the laser light repeatedly and sinusoidally varies, as the movable mirror 115 is moved. The zero-cross detecting section 37 detects a zero-cross timing of the electrical signal which repeats such a sinusoidal pattern. The zero-cross detecting section 37 outputs the detected zero-cross timing to the AD conversion section 23. The AD conversion section 23 performs sampling of the electrical signal according to the light intensity of interfering light of measurement light input from the first light receiving section 21 at the detected zero-cross timing, and performs AD conversion.

The control computing section 41a controls the respective parts of the Fourier transform spectrometer Da according to the functions of the respective parts for obtaining a spectrum of measurement light. The control computing section 41a is constituted of a microcomputer provided with a CPU (Central Processing Unit), a non-volatile storage element such as an ROM (Read Only Memory) or an EEPROM (Electrically Erasable Programmable Read Only Memory) which stores in advance various programs to be executed by the CPU and data necessary for the execution, a volatile storage element such as an RAM (Random Access Memory) serving as a working memory of the CPU, and peripheral circuits thereof. The control computing section 41a is functionally constituted of a spectrum computing section 411a by executing a program.

The spectrum computing section 411a obtains a spectrum of the measurement light by subjecting an integrated interferogram obtained by integrating interferograms of the measurement light generated by the interferometer 11a to a Fourier transform. In this embodiment, for instance, the spectrum computing section 411a is functionally constituted of an extracting section 4111, a retrieving section 4112, an integrating section 4113, and a computing section 4114a by executing a program.

In extracting an output within a predetermined range from an output of the interferometer 11a, the extracting section 4111 sets the predetermined range to be extracted according to positioning information of a center burst in an interferogram of the measurement light measured at a time before measurement of an interferogram of the measurement light at the present time, and extracts the output within the predetermined range from the output of the interferometer 11a.

The output within the predetermined range extracted by the extracting section 4111 is measurement data at the respective sampling points within the predetermined range, and constitutes a group of measurement data. The output within the predetermined range extracted by the extracting section 4111 is hereinafter called as a "measurement data group", as necessary, in order to discriminate from measurement data at a sampling point (AD conversion point or measurement point) as one data.

The positioning information is data for use in matching the center burst positions with each other with respect to each of the measurement data groups extracted by the extracting section 4111 in order to integrate interferograms of measurement light by the integrating section 4113. By using the positioning information, measurement data at a measurement point away from a measurement point of the center burst by the same number of measurement points become measurement data having the same optical path length difference as each other. An example of the positioning information is a shift amount between a center burst position of an interferogram at the first measurement, and a center burst position of an interferogram at a time before the first measurement.

In this embodiment, more specifically, in extracting an output within a predetermined range from an output of the interferometer 11a, the extracting section 4111 sets a predetermined range to be extracted at the present time by shifting a start position of the predetermined range to be extracted at the present time according to a shift amount between the center burst position of an interferogram at the first measurement, and the center burst position of an interferogram at a time before the first measurement, while expanding the predetermined range to be extracted at the present time according to the number of times of measurements with respect to the predetermined range extracted at the first measurement; and extracts the output within the predetermined range from the output of the interferometer 11a.

The retrieving section 4112 retrieves measurement data having the same optical path length difference as each other from the respective outputs within the respective predetermined ranges extracted by the extracting section 4111 for integrating the interferograms of measurement light by the integrating section 4113.

The integrating section 4113 generates an integrated interferogram by summing up measurement data having the same optical path length difference as each other, which has been retrieved by the retrieving section 4112 from the respective outputs (the respective measurement data groups) within the respective predetermined ranges extracted by the extracting section 4111 for integrating the interferograms of measurement light.

The computing section 4114a obtains a spectrum of the measurement light by subjecting the integrated interferogram generated by the integrating section 4113 to a Fourier transform.

The input section 42 is a device which allows an operator to input, to the Fourier transform spectrometer Da, various commands such as a command designating measurement start, and various data necessary for measuring a spectrum, such as input of an identifier of a light source SM as a measurement object, or selection/input of a window function to be used in a Fourier transform. Examples of the input section 42 are a keyboard and a mouse. The output section 43 is a device for outputting a command or data input from the input section 42, and a spectrum of measurement light by the Fourier transform spectrometer Da. Examples of the output section 43 are a display device such as a CRT display, an LCD, an organic EL display, and a plasma display; and a printing device such as a printer.

Figure 3B:
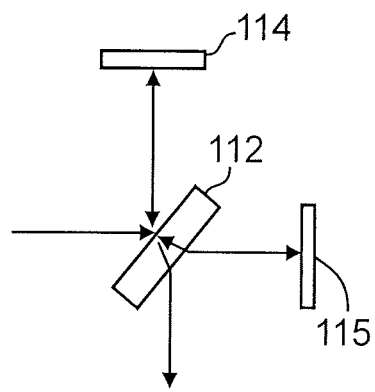
Figure 3C:
Figure 3D:
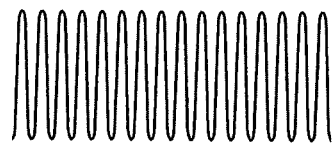
Figure 4:
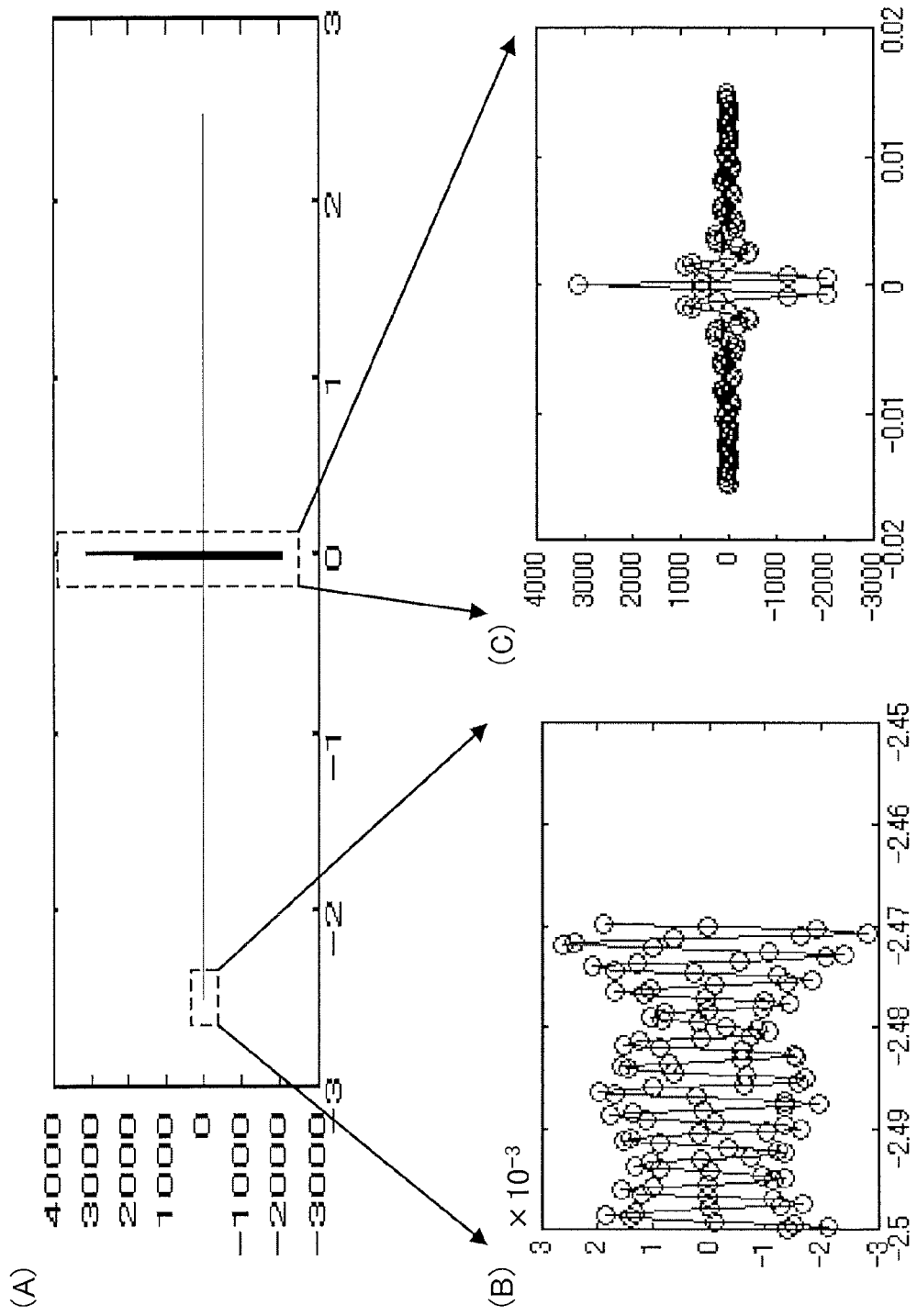
FIG. 4 is diagrams showing an example of a waveform (interferogram) of interfering light of actually measured measurement light in the Fourier transform spectrometer according to the first embodiment.
Figure 5:
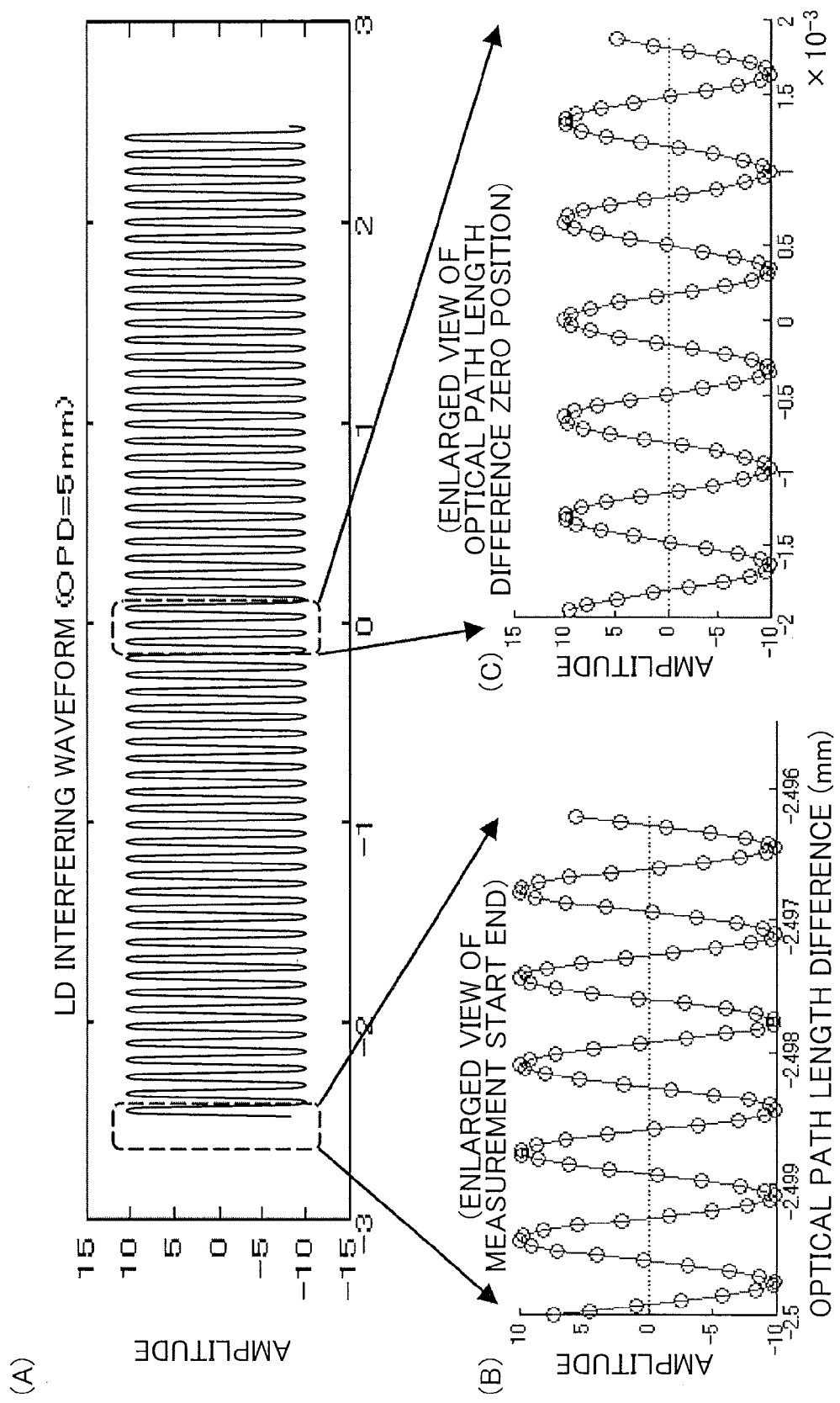
FIG. 5 is diagrams showing an example of an interfering waveform of actually measured laser light from the position measurement light source in the Fourier transform spectrometer according to the first embodiment.
Figure 6:
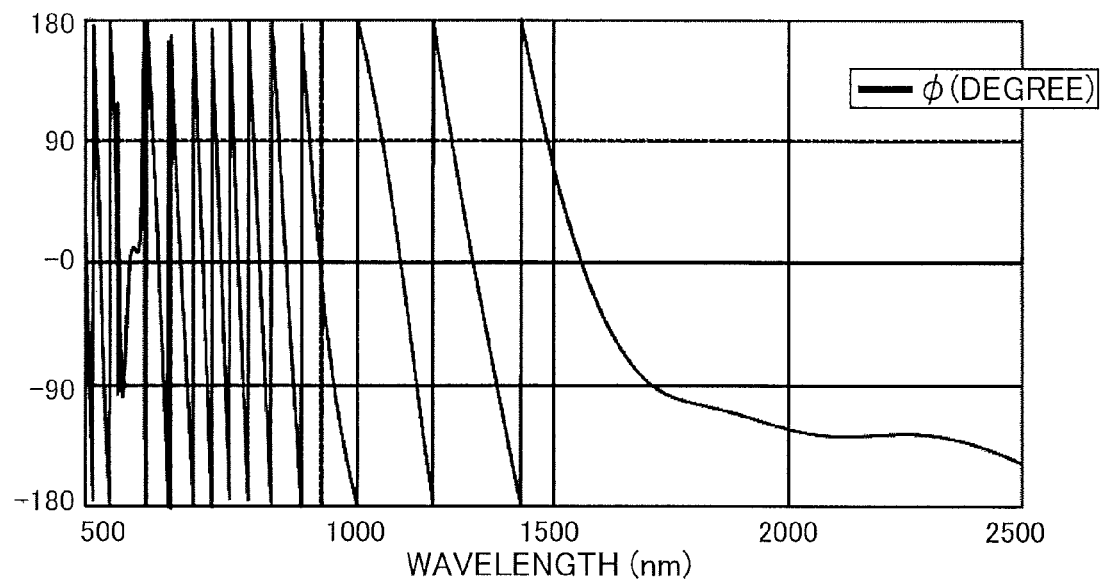
FIG. 6 is a diagram showing a phase shift generated on a semitransparent mirror.
Figure 7:
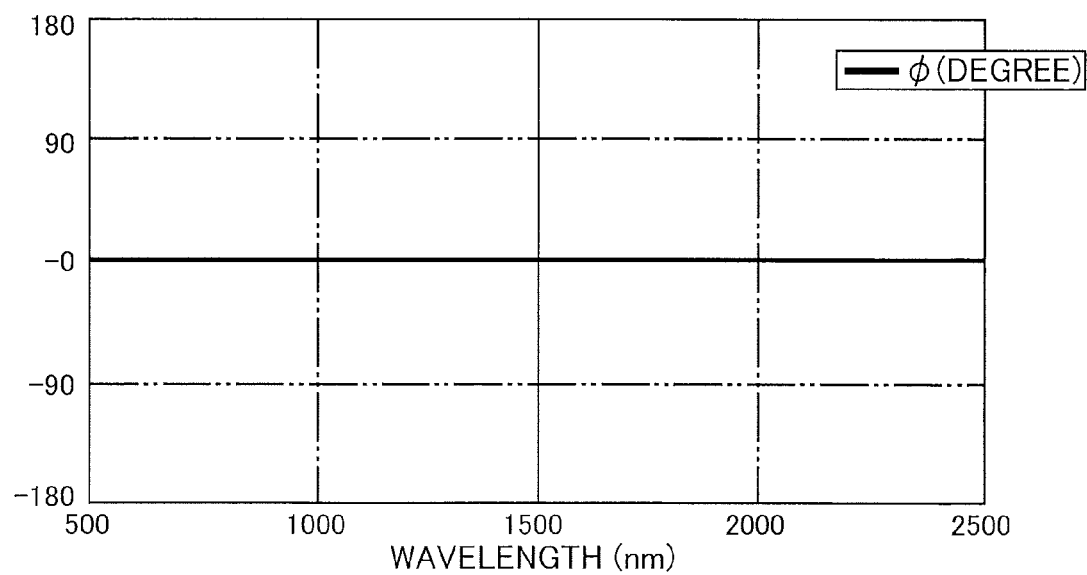
FIG. 7 is a diagram showing a phase, in the case where a phase shift generated on a semitransparent mirror is phase-compensated.
Figure 8A:
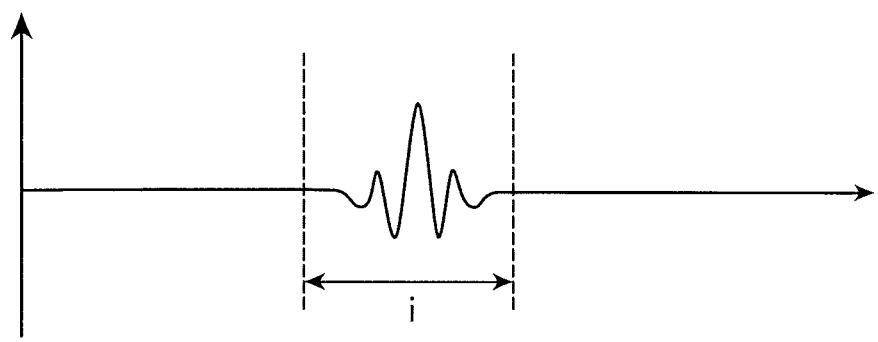
FIGS. 8A, 8B, and 8C are diagrams for describing a predetermined range to be extracted by an extracting section in the first embodiment.
Figure 8B:
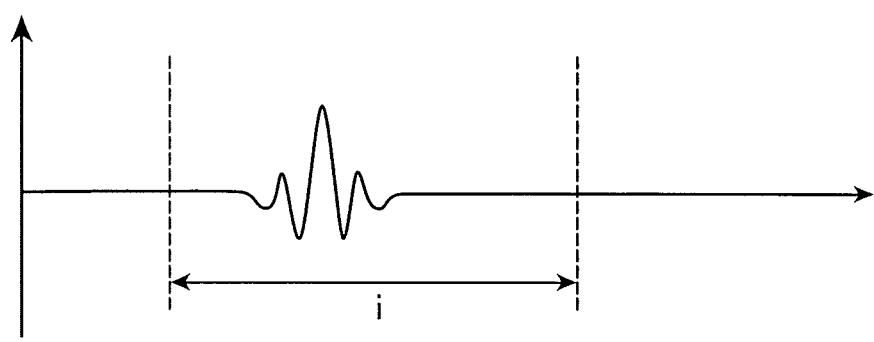
Figure 8C:
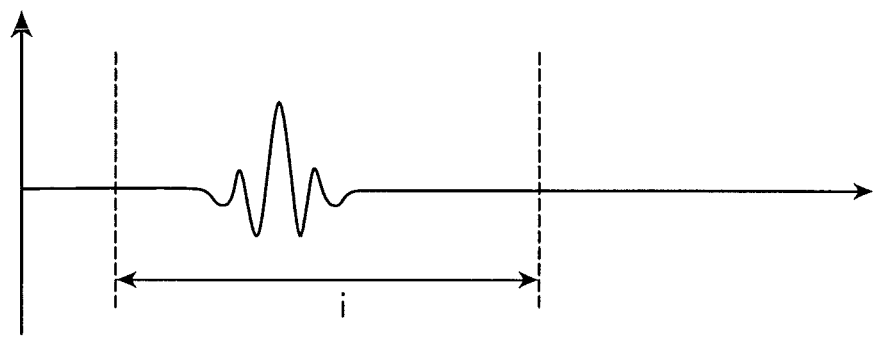
Figure 9:
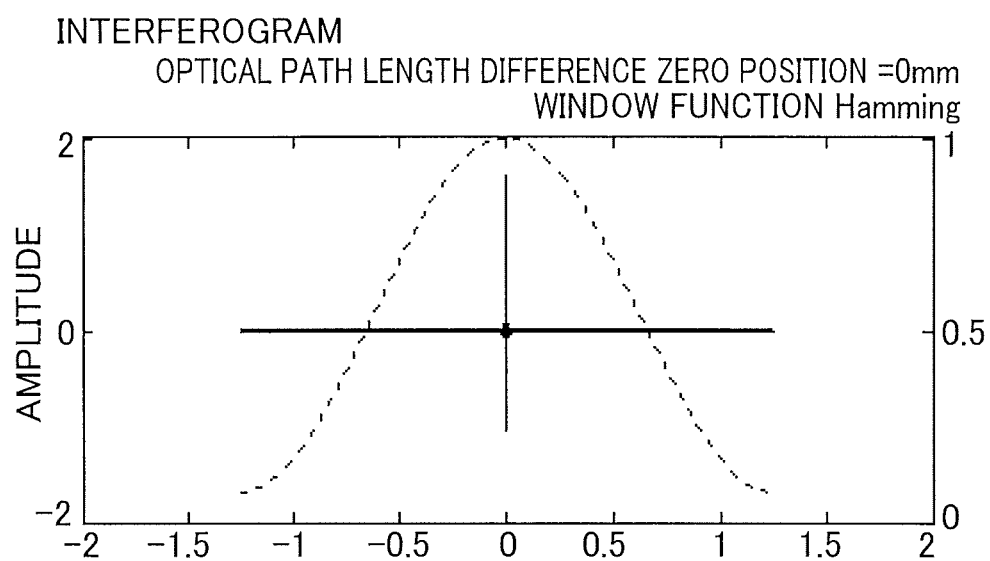
FIG. 9 is a diagram showing a relationship between an interferogram and a window function.

In the following, an operation of this embodiment is described. FIGS. 3A, 3B, 3C, and 3D are diagrams for describing a configuration of an interferometer, an interferometer without a phase compensation plate CP, a waveform (interferogram) of interfering light of measurement light, and a waveform of interfering light of laser light from a position measurement light source in the Fourier transform spectrometer according to the first embodiment. FIG. 3A shows a configuration of an interferometer in the Fourier transform spectrometer according to the first embodiment. FIG. 3B shows a Michelson interferometer without a phase compensation plate CP for phase compensation. FIG. 3C schematically shows a waveform (interferogram) of interfering light of measurement light. FIG. 3D schematically shows a waveform of interfering light of laser light from the position measurement light source. FIG. 4 is diagrams showing an example of a waveform (interferogram) of interfering light of actually measured measurement light in the Fourier transform spectrometer according to the first embodiment. The diagram (A) in FIG. 4 shows the entirety of the waveform, the diagram (B) in FIG. 4 shows a part of the waveform in the vicinity of zero level, and the diagram (C) in FIG. 4 shows a part of the waveform in the vicinity of a center burst. FIG. 5 is diagrams showing an example of an interfering waveform of actually measured laser light from the position measurement light source in the Fourier transform spectrometer according to the first embodiment. The diagram (A) in FIG. 5 shows the entirety of the waveform, the diagram (B) in FIG. 5 shows a part of the waveform in the vicinity of an end thereof, and the diagram (C) in FIG. 5 shows a part of the waveform in the vicinity of a maximum value thereof FIG. 6 is a diagram showing a phase shift generated on a semitransparent mirror. FIG. 7 is a diagram showing a phase, in the case where a phase shift generated on a semitransparent mirror is phase-compensated. In FIG. 6 and FIG. 7, the horizontal axis indicates a wavelength in the unit of nm, and the vertical axis indicates a phase in the unit of degree. FIGS. 8A, 8B, and 8C are diagrams for describing a predetermined range to be extracted by the extracting section in the first embodiment. FIGS. 8A, 8B, and 8C respectively and schematically show measurement results at the first measurement, at the (n−1)-th measurement, and at the n-th measurement (where n is a positive integer of 2 or larger). FIG. 9 is a diagram showing a relationship between an interferogram and a window function. In FIG. 9, the horizontal axis indicates an optical path length difference, and the vertical axis indicates an amplitude.

When measurement is started, the Fourier transform spectrometer Da receives measurement light radiated from the measurement object SM. The measurement light is incident to the interferometer 11a, and is received on the first light receiving section 21 as interfering light of the measurement light. More specifically, the measurement light is collimated as parallel light by the collimator lens 111, and is separated into first measurement light and second measurement light by reflection on and transmission through the semitransparent mirror 112 via the beam splitter 33. The first measurement light reflected on the semitransparent mirror 112 is incident to the fixed mirror 114 via the phase compensation plate CP. After the first measurement light is reflected on the fixed mirror 114, the first measurement light travels backward to the semitransparent mirror 112 along the incoming optical path. On the other hand, the second measurement light transmitted through the semitransparent mirror 112 is incident to the movable mirror 115. After the second measurement light is reflected on the movable mirror 115, the second measurement light travels backward to the semitransparent mirror 112 along the incoming optical path. The first measurement light reflected on the fixed mirror 114, and the second measurement light reflected on the movable mirror 115 merge and interfere with each other on the semitransparent mirror 112. The interfering light of the measurement light is output from the interferometer 11a to the first light receiving section 21. The first light receiving section 21 photoelectrically converts the interfering light of the incident measurement light, and outputs an electrical signal according to a light intensity of the interfering light of the measurement light to the amplifying section 22. The amplifying section 22 amplifies the electrical signal according to the interfering light of the measurement light with a predetermined gain, and outputs the amplified electrical signal to the AD conversion section 23.

On the other hand, the Fourier transform spectrometer Da also receives monochromatic laser light emitted from the position measurement light source 31a. The laser light is incident to the interferometer 11a via the beam splitter 33, is interfered in the interferometer 11a substantially in the same manner as described above, and is received on the second light receiving section 36 via the beam splitter 34 as interfering light of the laser light. The second light receiving section 36 photoelectrically converts the interfering light of the incident laser light, and outputs an electrical signal according to a light intensity of the interfering light of the laser light to the zero-cross detecting section 37. The zero-cross detecting section 37 detects a timing at which the electrical signal according to the interfering light of the laser light becomes zero, as a zero-cross timing; and outputs the zero-cross timing to the AD conversion section 23, as a sampling timing (AD conversion timing).

During a time when the aforementioned measurement light and laser light are respectively received in the interferometer 11a, the movable mirror 115 of the interferometer 11a is moved along the optical axis direction according to the control of the control computing section 41.

The AD conversion section 23 performs sampling of the electrical signal according to the light intensity of the interfering light of the measurement light output from the amplifying section 22 at the zero-cross timing input from the zero-cross detecting section 37, performs AD conversion of the sampled analog signal to a digital signal, and outputs the digital electrical signal to the spectrum computing section 411 of the control computing section 41. As exemplified in FIG. 3D or FIG. 5, the light intensity of interfering light of monochromatic laser light repeats a sinusoidal pattern, as the movable mirror 115 is moved. In this way, the Fourier transform spectrometer Da acquires a sampling timing of AD conversion by detecting a zero-cross timing as described above.

By performing the above operation, the interferogram as shown in FIG. 3C and FIG. 4 is input from the AD conversion section 23 to the spectrum computing section 411 of the control computing section 41.

In the following, phase compensation in the Fourier transform spectrometer Da of this embodiment is described.

As shown in FIG. 3B, a Michelson interferometer without a phase compensation plate CP for the phase compensation is provided with a semitransparent mirror 112, a fixed mirror 114, and a movable mirror 115 to be moved in the optical axis direction. The fixed mirror 114 and the movable mirror 115 are respectively disposed at such positions that the optical axes thereof are orthogonal to each other. The semitransparent mirror 112 is disposed at such a position that the optical axis thereof intersects with each of the optical axes of the fixed mirror 114 and the movable mirror 115 at an angle of 45 degrees, and that a semitransparent mirror surface thereof is located at an intersection of the optical axes. In the thus configured Michelson interferometer, there are formed two optical paths i.e. a first optical path (in this example, semitransparent mirror 112→fixed mirror 114→semitransparent mirror 112) along which measurement light is reflected on the semitransparent mirror 112, is incident to the fixed mirror 114, is reflected on the fixed mirror 114, returns to the semitransparent mirror 112, and then is transmitted through the semitransparent mirror 112; and a second optical path (in this example, semitransparent mirror 112→movable mirror 115→semitransparent mirror 112) along which measurement light is transmitted through the semitransparent mirror 112, is incident to the movable mirror 115, is reflected on the movable mirror 115, returns to the semitransparent mirror 112, and then is reflected on the semitransparent mirror 112.

In this example, in a state that the semitransparent mirror 112, the fixed mirror 114, and the movable mirror 115 are disposed as described above in such a manner that the optical path length difference between the first and second optical paths becomes zero, assuming that the first and second optical paths are made of a same medium, there is no phase difference between the first measurement light separated on the semitransparent mirror 112 and propagating along the first optical path, and the second measurement light separated on the semitransparent mirror 112 and propagating along the second optical path at a merging position (interfering position). The case that the first and second optical paths are made of a same medium includes a case, in which the first and second optical paths are made of the same material as the material of a transparent substrate of the semitransparent mirror 112, and a case, in which the semitransparent mirror 112, the fixed mirror 114, and the movable mirror 115 are respectively disposed in vacuo or in a gas, and the semitransparent mirror 112 is constituted only of a semitransparent mirror surface. The semitransparent mirror surface of the semitransparent mirror 112 normally has a negligible thickness.

Actually, however, as shown in FIG. 3B, the semitransparent mirror 112 is constituted of a transparent substrate made of a transparent material e.g. a glass material with respect to the wavelength of measurement light or laser light, and a semitransparent mirror surface such as a metal thin film or a dielectric multilayer formed on a principal plane of the transparent substrate. Accordingly, as shown in FIG. 3B, at the time of merging (interfering), although the first measurement light on the first optical path does not pass through the transparent substrate of the semitransparent mirror 112, the second measurement light on the second optical path passes through the transparent substrate of the semitransparent mirror 112 twice. As a result, even in the aforementioned state that the semitransparent mirror 112, the fixed mirror 114, and the movable mirror 115 are disposed in such a manner that the optical path length difference between the first and second optical paths becomes zero, assuming that the first and second optical paths constituted of the semitransparent mirror 112, the fixed mirror 114, and the movable mirror 115 are made of a same medium, the phase difference between the first and second optical paths does not become zero, resulting from the refractive index of the transparent substrate. Since the refractive index has a wavelength dependency, the phase shift amount resulting from the transparent substrate of the semitransparent mirror 112 has a wavelength dependency, as shown in the example of FIG. 6.

In view of the above, as shown in FIG. 3A or FIG. 2, in the aforementioned state that the semitransparent mirror 112, the fixed mirror 114, and the movable mirror 115 are disposed in such a manner that the optical path length difference between the first and second optical paths becomes zero, assuming that the first and second optical paths are made of a same medium, the interferometer 11a of this embodiment is provided with, between the semitransparent mirror 112 and the fixed mirror 114, a phase compensation plate CP having the same phase characteristics (refractive index characteristics) as the phase characteristics of the transparent substrate of the semitransparent mirror 112 in order to compensate for the aforementioned phase difference, which may be actually generated between the first measurement light separated on the semitransparent mirror 112 and propagating along the first optical path, and the second measurement light separated on the semitransparent mirror 112 and propagating along the second optical path at a merging position (interfering position). For instance, the phase compensation plate CP may be a transparent substrate itself of the semitransparent mirror 112 (in this case, there is no semitransparent mirror surface). Disposing the phase compensation plate CP as described above makes it possible to cancel out a phase difference between the first and second optical paths, as shown in FIG. 7. Use of the phase-compensated interferometer 11a as described above makes it possible to yield an interferogram of interfering light of measurement light, in which an initial phase difference of each of the wavelength components of the measurement light is zero. Thus, as shown in FIG. 3C, the interferogram has such a profile that the center burst is large and the side lobe is small. FIG. 4 shows an example of such an interferogram. As shown in FIG. 4, the center burst position in the interferogram, in the case where the initial phase difference of each of the wavelength components of measurement light is zero, is relatively distinguishable. The initial phase is a phase corresponding to the position (center burst position) where the optical path length difference is zero. Further, in this example, a phase compensation plate CP is used for the phase compensation. Alternatively, phase compensation may be performed by phase compensation computation invented by Mertz or Forman.

A digital signal including an interferogram, in which a center burst is relatively distinguishable, is output from the AD conversion section 23 of the light receiving processing section 20 to the spectrum computing section 411a of the control computing section 41a. The spectrum computing section 411a generates an integrated interferogram by integrating interferograms of measurement light generated by the interferometer 11a in order to improve the S/N ratio and to obtain a result with intended precision.

In this example, as far as the sampling count number at the time of measurement start is reset to zero, and the movable mirror 115 is moved regularly in each of the measurements in obtaining an integrated interferogram, a center burst appears at a position corresponding to the same numerical value (corresponding to the same measurement point number) of the sampling count number, and measurement data having the same numerical value (having the same measurement point number) of the sampling count number becomes measurement data having the same optical path length difference as each other. In this case, a range "i" including the position (center burst position) where the optical path length difference is zero as a center, is set as a predetermined range to be extracted by the extracting section 4111. In each of the measurements, measurement data at the respective sampling points is extracted within the range "i" every time from the output of the interferometer 11a. The range "i" is expressed by the following formula (1), for instance, assuming that $I_0$ denotes the position (center burst position) where the optical path length difference is zero, and nh denotes the number of measurement points to be extracted.

$$\left(I_0 - \frac{nh}{2}\right) \le i \le \left(I_0 + \frac{nh}{2} - 1\right) \quad (1)$$

In this example, the entirety of the interferograms is completely included in each of the extracted measurement data groups within the range "i", and measurement data having the same numerical value (having the same measurement point number) of the sampling count number becomes measurement data having the same optical path length difference as each other. Accordingly, it is possible to generate an integrated interferogram by summing up the measurement data having the same sampling count number as each other with respect to each of the measurement data groups extracted by the extracting section 4111.

On the other hand, the amplitude of a reflection surface may vary resulting from an influence of noise such as external vibration, taking into consideration that the movable mirror 115 in this embodiment is an element which generates an optical path length difference between the first and second optical paths by using resonant vibration. As a result, as shown in FIGS. 8A, 8B, and 8C, it is not always the case that a center burst appears at a position corresponding to the same numerical value of the sampling count number. In the case where measurement data at the respective sampling points is extracted within a certain range "i" every time from the output of the interferometer 11a in each of the measurements, in some of the cases, only a part of a center burst may be included, or a center burst may not be included at all in each of the extracted measurement data groups within the range "i".

In view of the above, the extracting section 4111 of this embodiment is configured in such a manner that, in extracting measurement data within the predetermined range "i" from the output of the interferometer 11a, the predetermined range "i" to be extracted is set according to the positioning information of a center burst in an interferogram of measurement light measured at a time before measurement of an interferogram of measurement light at the present time, and measurement data within the predetermined range "i" is extracted from the output of the interferometer 11 a. More specifically, in extracting measurement data within the predetermined range "i" from the output of the interferometer 11a, the extracting section 4111 of this embodiment sets the predetermined range "i" to be extracted at the present time by shifting a start position of the predetermined range "i" to be extracted at the present time according to a shift amount between the center burst position of an interferogram at the first measurement, and the center burst position of an interferogram at a measurement before the first measurement; and extracts the measurement data within the predetermined range "i" from the output of the interferometer 11a. Specifically, at the first measurement, the predetermined range "i" is expressed by the formula (1) (see FIG. 8A), at the (n−1)-th measurement, the predetermined range "i" is expressed by the following formula (2) (see FIG. 8B), and at the n-th measurement, the predetermined range "i" is expressed by the following formula (3) (see FIG. 8C), assuming that $I_0$ and nh respectively denote the position where the optical path length difference is zero and the number of data points to be extracted at the first measurement, (nh+nr) denotes the number of data points to be extracted at the n-th measurement, and $k_0$ (n−1) denotes a shift amount between the center burst position of an interferogram at the first measurement, and the center burst position of an interferogram at the measurement ((n−1)-th measurement) before the first measurement.

$$\left(\left(I_0 + k_0(n-2) - \frac{nh+nr}{2}\right) \le i < \left(I_0 + k_0(n-2) + \frac{nh+nr}{2}\right)\right) \quad (2)$$

$$\left(\left(I_0 + k_0(n-1) - \frac{nh+nr}{2}\right) \le i < \left(I_0 + k_0(n-1) + \frac{nh+nr}{2}\right)\right) \quad (3)$$

After each of the measurement data groups is extracted by the extracting section 4111 as described above, the retrieving section 4112 retrieves measurement data having the same optical path length difference as each other with respect to each of the measurement data groups extracted by the extracting section 4111.

In this embodiment, for instance, the retrieving section 4112 retrieves measurement data having the same optical path length difference as each other by obtaining a maximum value having cross correlation with respect to the measurement data group extracted by the extracting section 4111 at the first measurement, and with respect to the measurement data group extracted by the extracting section 4111 at the n-th measurement (n is a positive integer of 2 or larger). More specifically, at first, the retrieving section 4112 obtains a cross-correlation function $\phi(k)$ regarding the nh point by the following formula (4-1), while sequentially shifting the value of k within the range: $0 \le k \le (nr-1)$, assuming that i denotes the sampling count number (measurement point number), Interferogram$_1$(i) denotes the measurement data group extracted by the extracting section 4111 at the first measurement, and Interferogram$_n$(i) denotes the measurement data group extracted by the extracting section 4111 at the n-th measurement (where n is a positive integer of 2 or larger). Then, the retrieving section 4112 retrieves a maximum value k of the cross-correlation function $\phi(k)$. Then, the retrieving section 4112 retrieves measurement data having the same optical path length difference as each other by shifting the measurement point number of the measurement data group Interferogram$_n$(i) extracted by the extracting section 4111 at the n-th measurement (where n is a positive integer of 2 or larger) by a shift amount $k_0(n)$ obtained by the following formula (4-2). Specifically, measurement data having a measurement point number j(j∈i) in the measurement data group Interferogram$_1$(i) extracted by the extracting section 4111 at the first measurement, and measurement data having a measurement point number j+$k_0$(n) in the measurement data group Interferogram$_n$(i) extracted by the extracting section 4111 at the n-th measurement are measurement data having the same optical path length difference as each other.

$$\phi(k) = \sum_{j=0}^{nh-1} \left\{ Interferogram_1\left(I_0 - \frac{nh}{2} + j\right) \times \right.$$
$$\left. Interferogram_n\left(I_0 - \frac{nh}{2} - \frac{nr}{2} + k_0(n-1) + k + j\right) \right\}$$
$$(0 \le k \le (nr-1)) \quad (4\text{-}1)$$

$$k_0(n) = k_0(n-1) + k \quad (4\text{-}2)$$

Further, for instance, the retrieving section 4112 may retrieve measurement data having the same optical path length difference as each other by obtaining a minimum value in a sum of squares of differences regarding the respective measurement points between the measurement data group Interferogram$_1$(i) extracted by the extracting section 4111 at the first measurement, and the measurement data group Interferogram$_n$(i) extracted by the extracting section 4111 at the n-th measurement (where n is a positive integer of 2 or larger). More specifically, the retrieving section 4112 obtains the sum $\Delta_2(k)$ of squares of differences regarding the nh point according to the following formula (5-1) while sequentially shifting the value of k within the range: $0 \le k \le (nr-1)$, and retrieves the minimum value k in the sum $\Delta_2(k)$ of squares of differences. Then, the retrieving section 4112 retrieves measurement data having the same optical path length difference by shifting the measurement point number of the measurement data group Interferogram$_n$(i) extracted at the n-th measurement (where n is a positive integer of 2 or larger) by the extracting section 4111 by a shift amount $k_0(n)$ obtained by the following formula (5-2).

$$\Delta_2(k) =$$
$$m_1\left(I_0 - \frac{nh}{2} + j\right) - Interferogram_n\left(I_0 - \frac{nh}{2} - \frac{nr}{2} + k_0(n-1) + k + j\right)\}^2$$

$(0 \le k \le (nr-1))$ (5-1)

$k_0(n) = k_0(n-1) + k$ (5-2)

Further, for instance, the retrieving section 4112 may retrieve measurement data having the same optical path length difference as each other by obtaining a minimum value in a sum of absolute values of differences regarding the respective measurement points between the measurement data group Interferogram$_1$(i) extracted by the extracting section 4111 at the first measurement, and the measurement data group Interferogram$_n$(i) extracted by the extracting section 4111 at the n-th measurement (where n is a positive integer of 2 or larger). More specifically, the retrieving section 4112 obtains the sum $\Delta_A(k)$ of absolute values of differences regarding the nh point according to the following formula (6-1) while sequentially shifting the value of k within the range: $0 \le k \le (nr-1)$, and retrieves the minimum value k of the sum $\Delta_A(k)$ of absolute values of differences. Then, the retrieving section 4112 retrieves measurement data having the same optical path length difference as each other by shifting the measurement point number of the measurement data group Interferogram$_n$(i) extracted by the extracting section 4111 at the n-th measurement (where n is a positive integer of 2 or larger) by a shift amount $k_0(n)$ obtained by the following formula (6-2).

$$\Delta_A(k) = \sum_{j=0}^{nh-1} abs\left\{Interferogram_1\left(I_0 - \frac{nh}{2} + j\right) - \right.$$
$$\left. Interferogram_n\left(I_0 + -\frac{nh}{2} - \frac{nr}{2} + k_0(n-1) + k + j\right)\right\}$$

$(0 \le k \le (nr-1))$ (6-1)

$k_0(n) = k_0(n-1) + k$ (6-2)

The retrieving range may be expanded according to a shift amount $k_0(n-1)$ preceding the shift amount $k_0(n)$. For instance, in the case of $k_0(n-1)<0$, data regarding the measurement point $(nh+nr-k_0(n-1))$ within the range $[(I_0+k_0(n-1)-(nh+nr)/2) \le i \le (I_0+(I_0+(nh+nr)/2)]$ is used, as the data for use in positioning with respect to the measurement data group Interferogram$_n$(i) extracted at the n-th measurement. In the case of $k_0(n-1)>0$, data regarding the measurement point $(nh+nr-k_0(n-1))$ within the range $[(I_0-(nh+nr)/2) \le i \le (I_0+k_0(n-1)-(nh+nr)/2)]$ is used, as the data for use in positioning with respect to the measurement data group Interferogram$_n$(i) extracted at the n-th measurement.

After the data having the same optical path length difference as each other with respect to each of the measurement data groups is retrieved by the retrieving section 4112 as described above, the integrating section 4113 generates an integrated interferogram by summing up the measurement data having the same optical path length difference as each other, which has been retrieved by the retrieving section, with respect to each of the measurement data groups extracted by the extracting section 4111.

More specifically, an interferogram $Fm(x_i)$ at the m-th measurement is expressed by the following formula (7), assuming that $x_i$ denotes the optical path length difference, $v_j$ denotes the wavenumber, $B(v_j)$ denotes the spectrum amplitude at the wavenumber $v_j$, $X_0$ denotes the position where the optical path length difference is zero, and $\phi(v_j)$ denotes the phase of the wavenumber $v_j$ at the position where the optical path length difference is zero. The symbol m denotes a measurement result at the m-th measurement.

$$F_m(x_i) = \sum_j B(v_j) \cdot \cos(2\pi \cdot v_j \cdot (x_i - X_0) + \phi(v_j)) \quad (7)$$

Therefore, an integrated interferogram $F(x_i)$ is expressed by the following formula (8).

$$F(x_i) = \sum_{m=1}^{M} F_m(x_i) \quad (8)$$

In this way, after the integrated interferogram is obtained by the integrating section 4113, the computing section 4114a obtains a spectrum of measurement light by subjecting the integrated interferogram generated by the integrating section 4113 to e.g. a fast Fourier transform (FFT).

More specifically, in performing a fast Fourier transform, as shown in FIG. 9, in order to suppress a side lobe, the fast Fourier transform is performed by multiplying with a window function $A_{window}(x_i)$ (see the formula (9)), which is symmetrical with respect to the position (center burst position) where the optical path length difference is zero; and then, the amplitude $|B_{window}(v_j)|$ (see the formula (10)) of a spectrum of measurement light is obtained.

$$B_{window}(v_j) = fft(F(x_i) \times A_{window}(x_i)) \quad (9)$$

$$|B_{window}(v_j)| = \sqrt{\overline{B_{window}(v_j)} \times B_{window}(v_j)} \quad (10)$$

A variety of types of functions may be applied as the aforementioned window function $A_{window}(x_i)$. An example of the window function $A_{window}(x_i)$ is a function expressed by the following formulas (11-1) to (11-3). The formulas (11-1) and (11-2) are called as a Hamming Window function, and the formula (11-3) is called as a Blackman Window function.

$$A_{window}(x) = 0.5 + 0.5 \times \cos\left(\frac{2\pi \cdot x}{L_0}\right) \quad (11-1)$$

$$A_{window}(x) = 0.54 + 0.46 \times \cos\left(\frac{2\pi \cdot x}{L_0}\right) \quad (11-2)$$

$$A_{window}(x) = 0.42 + 0.5 \times \cos\left(\frac{2\pi \cdot x}{L_0}\right) + 0.08 \times \cos\left(\frac{4\pi \cdot x}{L_0}\right) \quad (11-3)$$

By optimizing the range to be extracted as described above, the spectrum computing section 411a generates an integrated interferogram by integrating interferograms of measurement light obtained by the interferometer 11a, and obtains a spectrum of the measurement light by subjecting the integrated interferogram to a Fourier transform. Then, the obtained spectrum of the measurement light is output to the output section 43.

As described above, according to the Fourier transform spectrometer Da and the Fourier transform spectroscopic method to be implemented by the Fourier transform spectrometer Da of this embodiment, in extracting an output within a predetermined range "i" from an output of the interferometer 11a, the predetermined range "i" to be extracted is set according to positioning information of a center burst in an interferogram of measurement light measured at a time before measurement of an interferogram of the measurement light at the present time. Accordingly, the Fourier transform spectrometer Da and the Fourier transform spectroscopic method of this embodiment are advantageous in appropriately extracting measurement data within a range which completely covers the entirety of the interferograms, because the positioning information obtained at a time before the present measurement is included. Thus, it is possible to appropriately integrate the interferograms.

Further, according to the Fourier transform spectrometer Da and the Fourier transform spectroscopic method to be implemented by the Fourier transform spectrometer Da of this embodiment, there are used, as the positioning information, a shift amount $k_0(n-1)$ between the center burst position of an interferogram at a first measurement, and the center burst position of an interferogram at a measurement before the first measurement. Accordingly, the Fourier transform spectrometer Da and the Fourier transform spectroscopic method to be implemented by the Fourier transform spectrometer Da of this embodiment are advantageous in appropriately extracting measurement data within a range which completely covers the entirety of interferograms, in the case where the shift amount $k_0(n-1)$ between an interferogram measured at a time preceding the present measurement, and an interferogram measured at the present time is small. Thus, it is possible to appropriately integrate the interferograms.

Further, according to the Fourier transform spectrometer Da and the Fourier transform spectroscopic method to be implemented by the Fourier transform spectrometer Da of this embodiment, it is possible to accurately retrieve measurement data having the same optical path length difference as each other, in retrieving the measurement data having the same optical path length difference as each other by using cross correlation. Thus, the Fourier transform spectrometer Da and the Fourier transform spectroscopic method to be implemented by the Fourier transform spectrometer Da of this embodiment are advantageous in appropriately integrating the interferograms.

Further, according to the Fourier transform spectrometer Da and the Fourier transform spectroscopic method to be implemented by the Fourier transform spectrometer Da of this embodiment, it is possible to accurately retrieve measurement data having the same optical path length difference as each other, in retrieving the measurement data having the same optical path length difference as each other by using the sum of squares of differences. Thus, the Fourier transform spectrometer Da and the Fourier transform spectroscopic method to be implemented by the Fourier transform spectrometer Da of this embodiment are advantageous in appropriately integrating the interferograms.

Further, according to the Fourier transform spectrometer Da and the Fourier transform spectroscopic method to be implemented by the Fourier transform spectrometer Da of this embodiment, it is possible to retrieve measurement data having the same optical path length difference as each other by simplified information processing, in retrieving the measurement data having the same optical path length difference as each other by using the sum of absolute values of differences.

Next, another embodiment is described.

(Second Embodiment)

In the Fourier transform spectrometer Da of the first embodiment, a phase difference generated on the semitransparent mirror 112 between the first and second optical paths is compensated by the phase compensation plate CP. Accordingly, a center burst is relatively distinguishable, and the amplitude of the center burst is relatively large. However, setting the entirety of the dynamic range of the AD conversion section 23 at a center burst so as not to saturate the AD conversion section 23 with the center burst may make it difficult to detect a signal of a low level in the vicinity of zero level in an interferogram with high resolution. In view of the above, there is proposed an approach of performing AD conversion of an interferogram by an AD converter which performs AD conversion of a signal having a relatively high level in the vicinity of a center burst in the interferogram, and by an AD converter which performs AD conversion of a signal having a low level in the vicinity of zero level in the interferogram. In this approach, two AD converters are necessary, and a time for synthesizing the outputs from the two AD converters is also necessary. In view of the above, there is proposed a Fourier transform spectrometer Db according to the second embodiment, as an apparatus capable of detecting a signal of a low level in the vicinity of zero level in an interferogram with high resolution with use of one AD conversion section, and a Fourier transform spectroscopic method to be implemented by the Fourier transform spectrometer Db.

Figure 10:
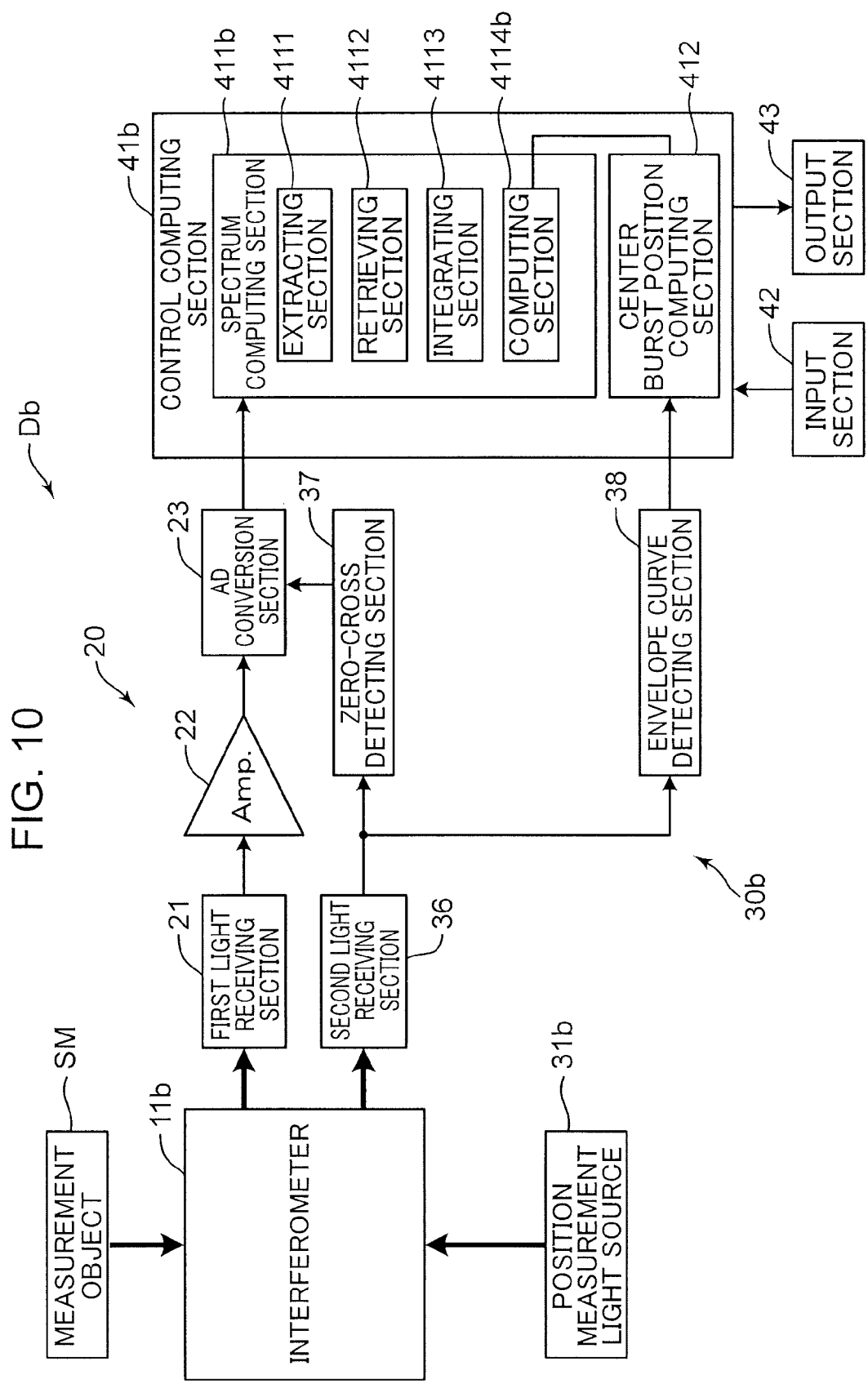
FIG. 10 is a block diagram showing a configuration of a Fourier transform spectrometer according to a second embodiment.
Figure 11:
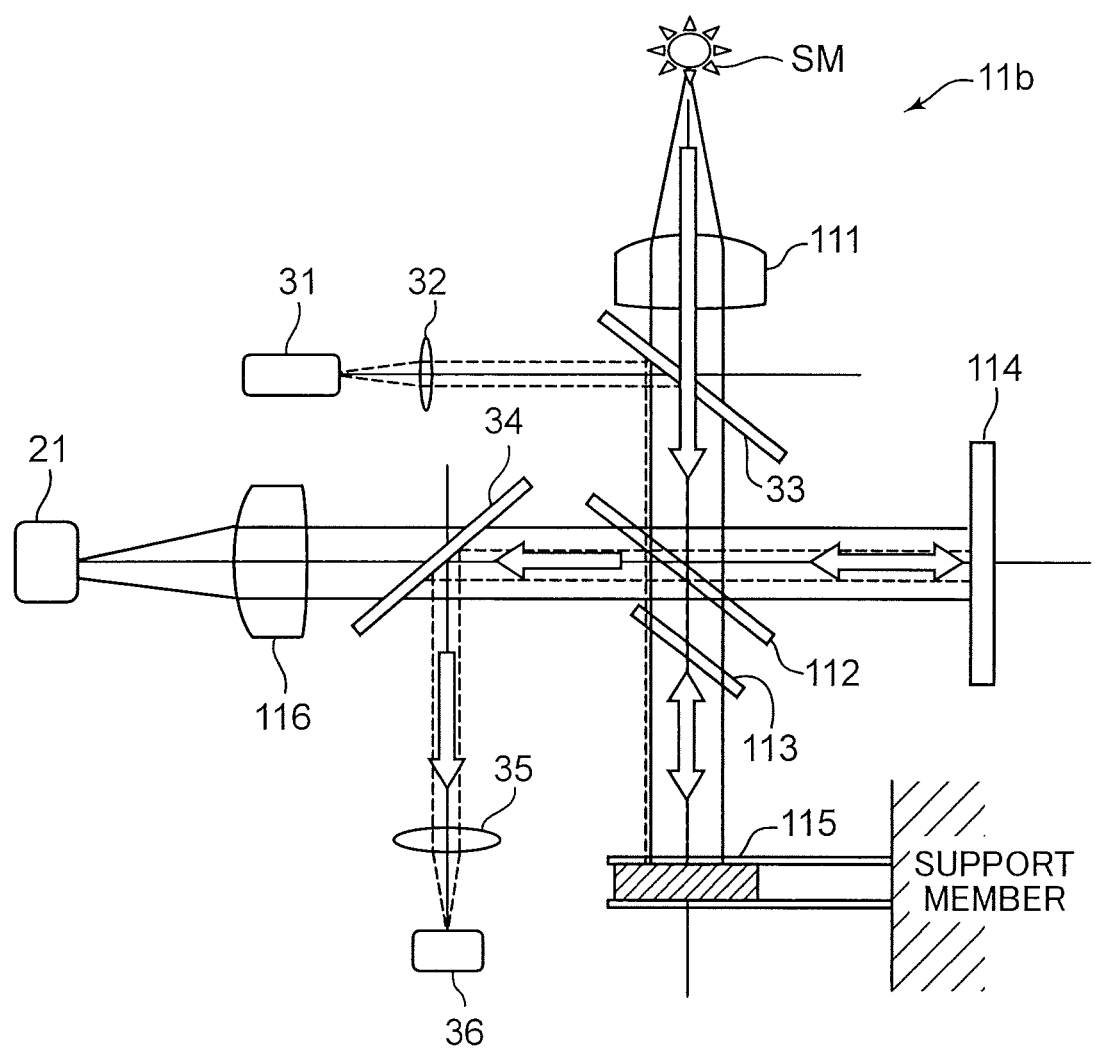
FIG. 11 is a diagram mainly showing a configuration of an interferometer in the Fourier transform spectrometer according to the second embodiment.
Figure 12:
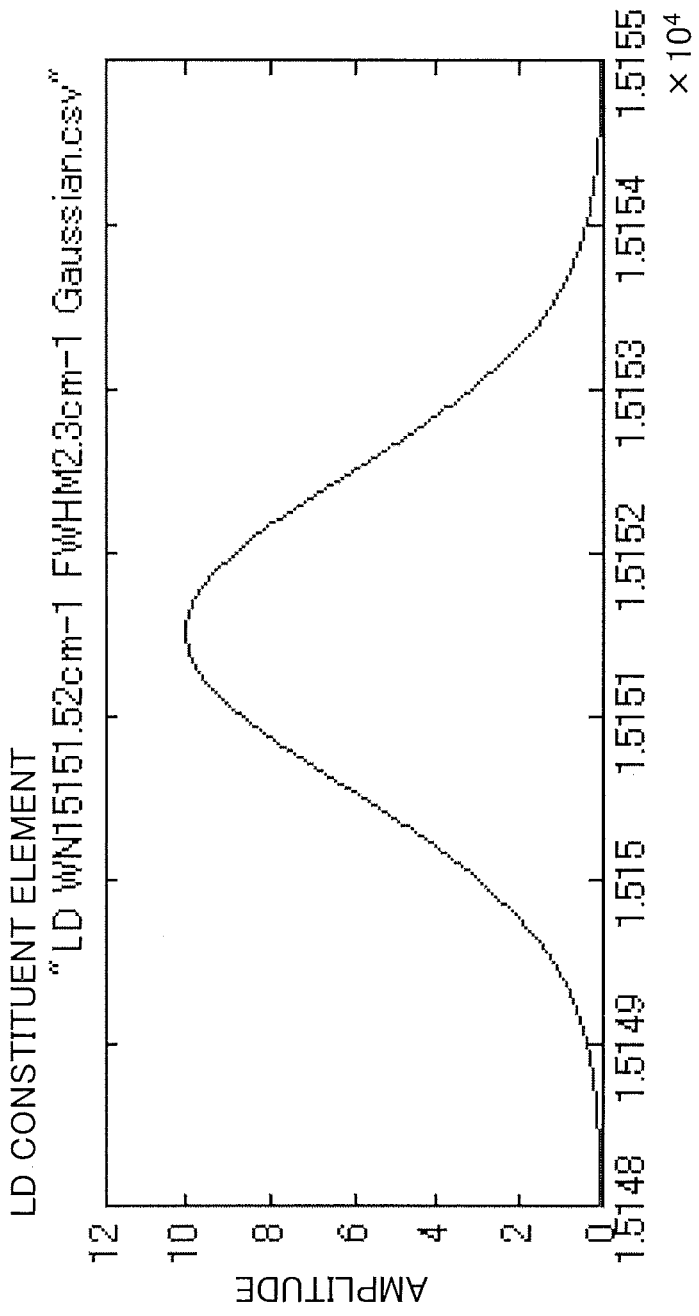
FIG. 12 is a diagram showing a spectrum of laser light to be emitted from a position measurement light source in the Fourier transform spectrometer according to the second embodiment.
Figure 13:
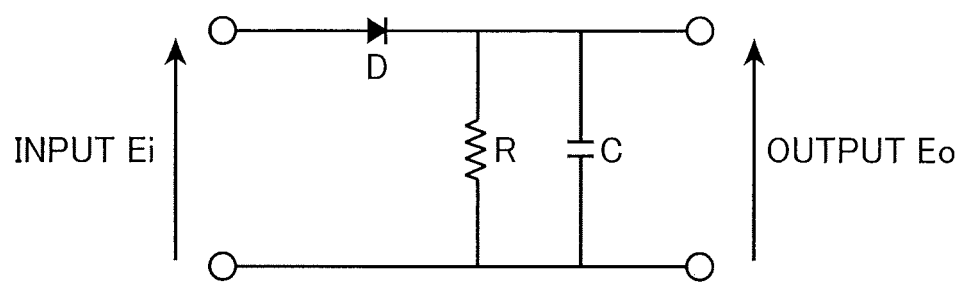
FIG. 13 is a circuit diagram showing a configuration of an envelope curve detecting section in the Fourier transform spectrometer according to the second embodiment.

FIG. 10 is a block diagram showing a configuration of the Fourier transform spectrometer according to the second embodiment. FIG. 11 is a diagram mainly showing a configuration of an interferometer in the Fourier transform spectrometer according to the second embodiment. FIG. 12 is a diagram showing a spectrum of laser light to be emitted from a position measurement light source in the Fourier transform spectrometer according to the second embodiment. In FIG. 12, the horizontal axis indicates a wavenumber (1/wavelength), and the vertical axis indicates a magnitude of amplitude. FIG. 13 is a circuit diagram showing a configuration of an envelope curve detecting section in the Fourier transform spectrometer according to the second embodiment.

As well as the Fourier transform spectrometer Da of the first embodiment, the Fourier transform spectrometer Db of the second embodiment is an apparatus for obtaining a spectrum of measurement light by measuring the measurement light to be measured by an interferometer, and by subjecting an integrated interferogram of the measured measurement light to a Fourier transform. As shown in FIG. 10 and FIG. 11, for instance, the Fourier transform spectrometer Db is provided with an interferometer 11b to which light (measurement light) radiated from a measurement object SM is incident for outputting interfering light of the measurement light, a light receiving processing section 20 which receives the interfering light of the measurement light obtained by the interferometer 11b, and outputs an electrical signal (electrical signal representing a light intensity change of the interfering light of the measurement light) of a waveform of the interfering light of the measurement light by photoelectric conversion, a position detection processing section 30b which detects a position of a movable mirror 115 of the interferometer 11b, a control computing section 41b, an input section 42, and an output section 43.

The light receiving processing section 20, the input section 42, and the output section 43 in the second embodiment are substantially the same as the light receiving processing section 20, the input section 42, and the output section 43 in the first embodiment, and therefore, the description thereof is omitted herein.

As well as the interferometer 11a in the first embodiment, the interferometer 11b allows incidence of measurement light to be measured, separates the incident measurement light into first measurement light and second measurement light, propagates the first measurement light and the second measurement light respectively along a first optical path and a second optical path different from each other, and merges the first measurement light and the second measurement light. In the case where there is an optical path length difference between the first and second optical paths from the separation point (separation position) of the measurement light to the merging point (merging position or interfering position) of the measurement light, an interference fringe is generated by the merging, because there is generated a phase difference at the time of merging. In the second embodiment, the interferometer 11b is a phase-difference interferometer actually having a phase difference between the first and second optical paths, in the case where a plurality of optical elements constituting the first and second optical paths are disposed in such a manner that the optical path length difference between the two optical paths becomes zero, assuming that the two optical paths are made of a same medium. Let us describe an example of the interferometer 11b by a Michelson interferometer. For instance, as shown in FIG. 11, the interferometer 1 lb is provided with a semitransparent mirror 112, a fixed mirror 114, and a movable mirror 115 whose light reflection surface is moved in the optical axis direction substantially in the same manner as the interferometer 11a described referring to FIG. 2. The interferometer 11b is further provided with a first phase difference plate 113 disposed on the transmitting side of the semitransparent mirror 112, in the case where measurement light is separated into first measurement light and second measurement light on the semitransparent mirror 112. Specifically, in this embodiment, the second measurement light transmitted through the semitransparent mirror 112 is incident to the movable mirror 115 via the first phase difference plate 113. After the second measurement light is reflected on the movable mirror 115, the second measurement light is incident to the semitransparent mirror 112 via the first phase difference plate 113.

The semitransparent mirror 112, the fixed mirror 114, and the movable mirror 115 in the interferometer 11b of the second embodiment are substantially the same as the semitransparent mirror 112, the fixed mirror 114, and the movable mirror 115 in the interferometer 11a of the first embodiment, and therefore, the description thereof is omitted herein.

The first phase difference plate 113 is a phase plate having an isotropy, and generates a phase shift in light propagating through the first phase difference plate 113 with respect to the phase of light propagating in vacuo or in the air by the distance equal to the thickness of the first phase difference plate 113. In this way, the Fourier transform spectrometer Db of the second embodiment is provided with the first phase difference plate 113, unlike the interferometer 11a of the Fourier transform spectrometer Da of the first embodiment, which is provided with the phase compensation plate CP.

Further, the Fourier transform spectrometer Db of the second embodiment is also provided with a collimator lens 111 as an incident optical system, and is also provided with a light collecting lens 116 as an exit optical system. The collimator lens 111 and the light collecting lens 116 in the second embodiment are substantially the same as the collimator lens 111 and the light collecting lens 116 in the Fourier transform spectrometer Da of the first embodiment, and therefore, the description thereof is omitted herein.

Further, the position detection processing section 30b is, for instance, provided with a position measurement light source 31b, a second light receiving section 36, a zero-cross detecting section 37, and an envelope curve detecting section 38. As shown in FIG. 11, the position detection processing section 30b is further provided with a collimator lens 32, a beam splitter 33, a beam splitter 34, and a light collecting lens 35 in order to obtain interfering light of laser light emitted from the position measurement light source 31b, with use of the interferometer 11b. Specifically, unlike the Fourier transform spectrometer Da of the first embodiment, the Fourier transform spectrometer Db of the second embodiment is provided with the position measurement light source 31b, in place of the position measurement light source 31a, and is further provided with the envelope curve detecting section 38. Thus, the second light receiving section 36, the zero-cross detecting section 37, the collimator lens 32, the beam splitter 33, the beam splitter 34, and the light collecting lens 35 in the Fourier transform spectrometer Db of the second embodiment are respectively and substantially the same as the second light receiving section 36, the zero-cross detecting section 37, the collimator lens 32, the beam splitter 33, the beam splitter 34, and the light collecting lens 35 in the Fourier transform spectrometer Da of the first embodiment, and therefore, the description thereof is omitted herein. The collimator lens 32, the beam splitter 33, the beam splitter 34, and the light collecting lens 35 in the second embodiment are disposed substantially in the same manner as those of the interferometer 11a shown in FIG. 2.

The position measurement light source 3 lb is a light source device which emits laser light having a predetermined line width. The position measurement light source 31b is, for instance, constituted of a semiconductor laser which emits laser light having a predetermined line width. Further, for instance, the position measurement light source 31b is provided with a laser device which emits monochromatic laser light, and a high frequency superimposition device which performs high frequency superimposition of the monochromatic laser light emitted from the laser device so as to emit laser light having the predetermined line width by performing high frequency superimposition of the monochromatic laser light. The predetermined line width is a wavelength width (frequency width) at which the magnitude of amplitude of interfering light of laser light obtained by the interferometer 11b varies, as the movable mirror 115 in the interferometer 11b is moved. In the case where laser light is emission light, as shown in FIG. 3D or FIG. 5 used in the description of the first embodiment, the magnitude of amplitude of interfering light of laser light does not vary, regardless of movement of the movable mirror 115 in the interferometer 11a. As shown in the example of FIG. 12, laser light having such a predetermined line width has a Gaussian profile, in which the half bandwidth (FWHM) is 2.3/cm with respect to the center wavenumber 15151.52/cm.

Laser light emitted from the position measurement light source 11b is incident to the interferometer 11b, and interfering light of the laser light is received on the second light receiving section 36. The second light receiving section 36 outputs an electrical signal according to a light intensity of the interfering light of the laser light to each of the zero-cross detecting section 37 and the envelope curve detecting section 38.

The envelope curve detecting section 38 is a circuit which detects an envelope curve of the electrical signal according to the light intensity of the interfering light of the laser light input from the second light receiving section 36. A variety of circuit configurations may be applied as the envelope curve detecting section 38. An example of the envelope curve detecting section 38 is, as shown in FIG. 13, constituted of a diode D, a resistor element R connected in series to the diode D by being connected to the cathode terminal of the diode D, and a capacitor C connected in parallel to the resistor element R. Both ends of the series-connected diode D and resistor element R serve as an input terminal, and both ends of the resistor element R serve as an output terminal. The envelope curve detecting section 38 is capable of detecting an envelope curve with such a simplified circuit configuration. The envelope curve detecting section 38 outputs, to a control computing section 41, the envelope curve of the electrical signal detected according to the light intensity of the interfering light of the laser light.

The control computing section 41b controls the respective parts of the Fourier transform spectrometer Db according to the functions of the respective parts so as to obtain a spectrum of measurement light. The control computing section 41b is functionally constituted of a spectrum computing section 411b and a center burst position computing section 412 by executing a program.

The spectrum computing section 411b obtains a spectrum of the measurement light by subjecting an integrated interferogram obtained by integrating interferograms of the measurement light generated by the interferometer 11b to a Fourier transform. In this embodiment, for instance, the spectrum computing section 411b is functionally constituted of an extracting section 4111, a retrieving section 4112, an integrating section 4113, and a computing section 4114b by executing a program. Specifically, unlike the spectrum computing section 411a in the Fourier transform spectrometer Da of the first embodiment, the spectrum computing section 411b in the Fourier transform spectrometer Db of the second embodiment is functionally constituted of the computing section 4114b, in place of the computing section 4114a. Accordingly, the extracting section 4111, the retrieving section 4112, and the integrating section 4113 of the spectrum computing section 411b in the Fourier transform spectrometer Db of the second embodiment are respectively and substantially the same as the extracting section 4111, the retrieving section 4112, and the integrating section 4113 of the spectrum computing section 411b in the Fourier transform spectrometer Da of the first embodiment, and therefore, the description thereof is omitted herein.

The computing section 4114b obtains a spectrum of measurement light by subjecting an integrated interferogram generated by the integrating section 4113 to a Fourier transform, based on a center burst position detected by the center burst position computing section 412.

The center burst position computing section 412 detects a center burst position in an intereferogram, in the case where an initial phase difference of each of the wavelength components of measurement light is zero. More specifically, in this embodiment, the center burst position computing section 412 detects a position at which a maximum value of an envelope curve detected by the envelope curve detecting section 38 is given, as the center burst position. In this way, in this embodiment, the center burst position is obtained by detecting an envelope curve of a light intensity of interfering light of laser light obtained by incidence of the laser light having a predetermined line width to the interferometer 11b, and by detecting a position at which a maximum value of the detected envelope curve is given.

Figure 14A:
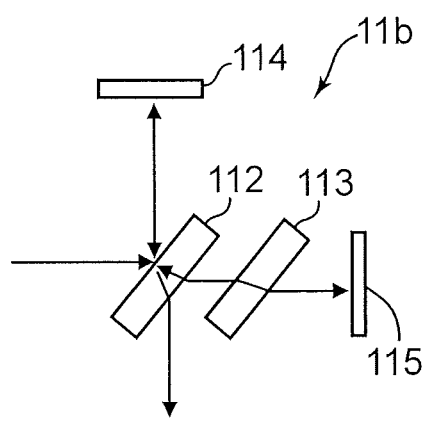
FIGS. 14A, 14B, and 14C are diagrams for describing a configuration of an interferometer, a waveform (interferogram) of interfering light of measurement light, and a waveform of interfering light of laser light from the position measurement light source in the Fourier transform spectrometer according to the second embodiment.
Figure 14B:
Figure 14C:
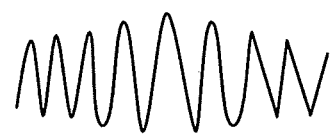
Figure 16:
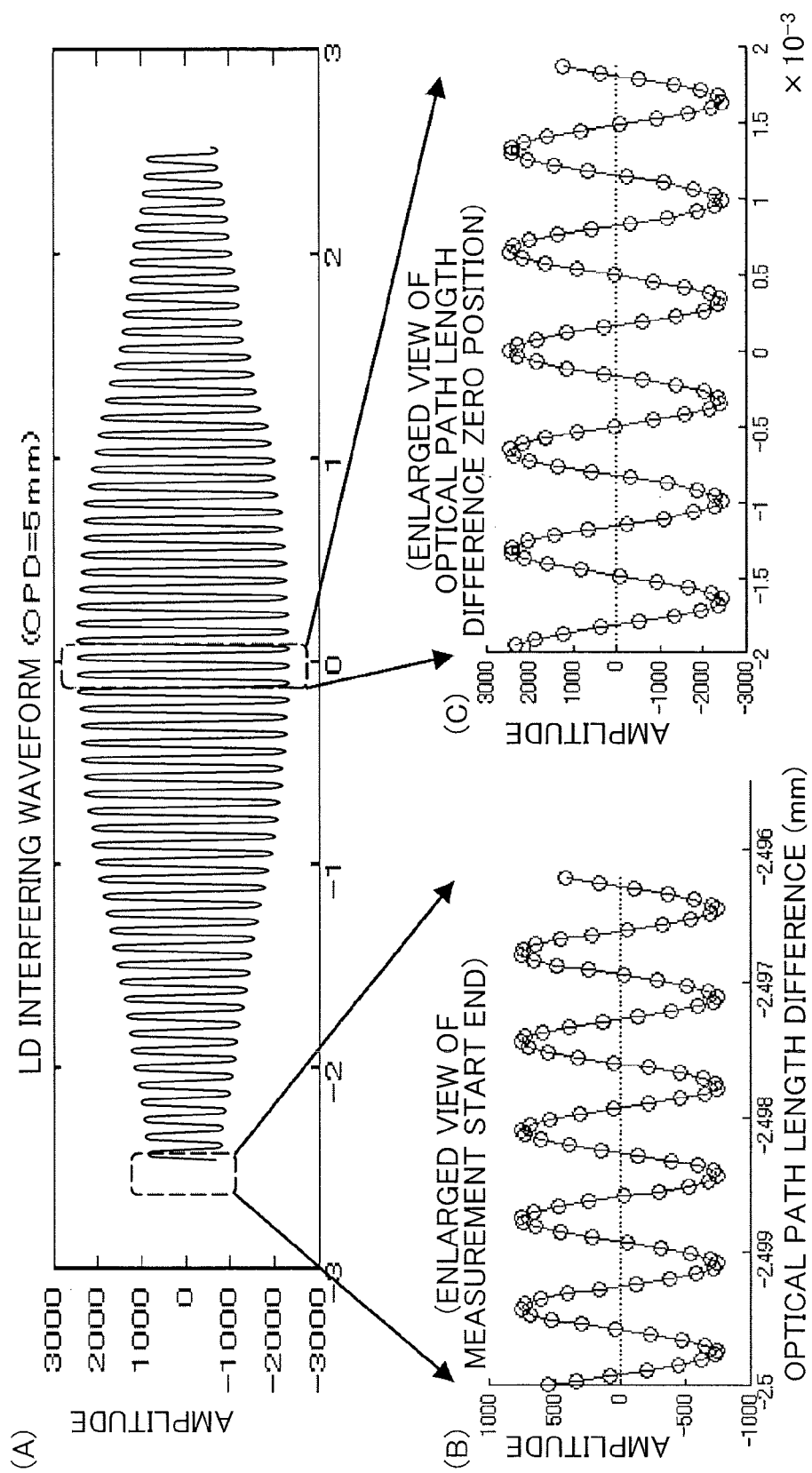
FIG. 16 is diagrams showing an example of an interfering waveform of actually measured laser light from the position measurement light source in the Fourier transform spectrometer according to the second embodiment.
Figure 17A:
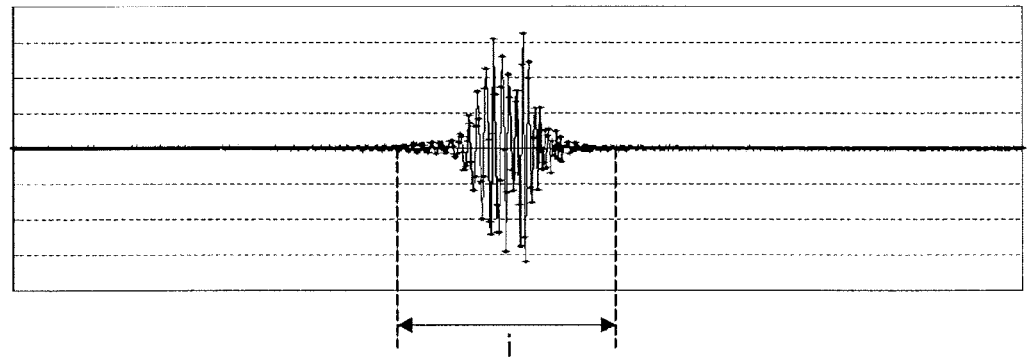
FIG. 17A, 17B, and 17C are diagrams for describing a predetermined range to be extracted by an extracting section in the second embodiment.
Figure 17B:
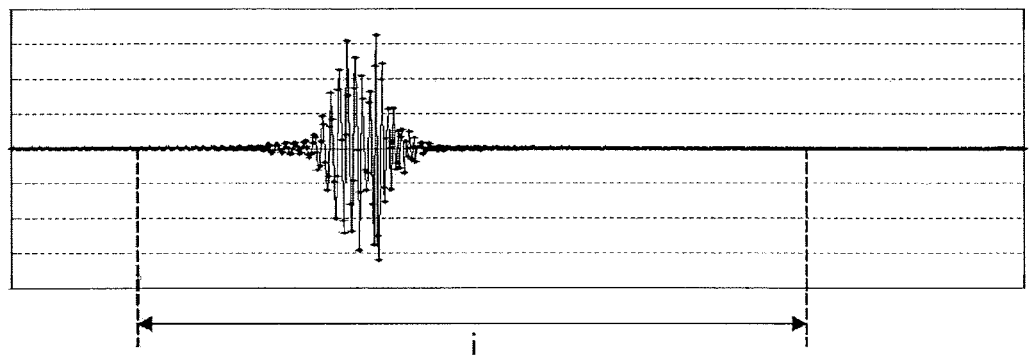
Figure 17C:
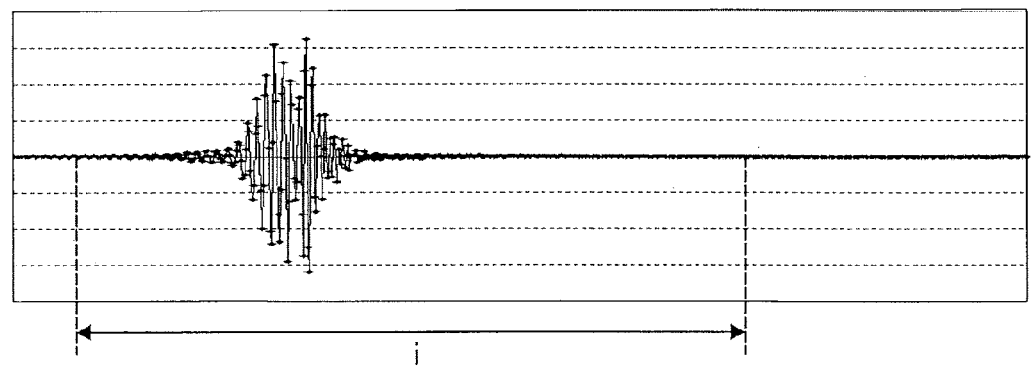

In the following, an operation of this embodiment is described. FIGS. 14A, 14B, and 14C are diagrams for describing a configuration of an interferometer, a waveform (interferogram) of interfering light of measurement light, and a waveform of interfering light of laser light from the position measurement light source in the Fourier transform spectrometer according to the second embodiment. FIG. 14A shows a configuration of an interferometer in the Fourier transform spectrometer according to the second embodiment. FIG. 14B schematically shows a waveform (interferogram) of interfering light of measurement light. FIG. 14C schematically shows a waveform of interfering light of laser light from the position measurement light source. FIG. 15 is diagrams showing an example of a waveform (interferogram) of interfering light of actually measured measurement light in the Fourier transform spectrometer according to the second embodiment. The diagram (A) in FIG. 15 shows the entirety of the waveform, the diagram (B) in FIG. 15 shows a part of the waveform in the vicinity of zero level, and the diagram (C) in FIG. 15 shows a part of the waveform in the vicinity of a center burst. FIG. 16 is diagrams showing an example of an interfering waveform of actually measured laser light from the position measurement light source in the Fourier transform spectrometer according to the second embodiment. The diagram (A) in FIG. 16 shows the entirety of the waveform, the diagram (B) in FIG. 16 shows a part of the waveform in the vicinity of an end thereof, and the diagram (C) in FIG. 16 shows a part of the waveform in the vicinity of a maximum value thereof. FIGS. 17A, 17B, and 17C are diagrams for describing a predetermined range to be extracted by the extracting section in the second embodiment. FIGS. 17A, 17B, and 17C respectively and schematically show measurement results at the first measurement, at the (n−1)-th measurement, and at the n-th measurement (where n is a positive integer of 2 or larger).

When measurement is started, the Fourier transform spectrometer Db receives measurement light radiated from the measurement object SM. The measurement light is incident to the interferometer 11b, and is received on the first light receiving section 21 as interfering light of the measurement light substantially in the same manner as the interferometer 11a of the Fourier transform spectrometer Da of the first embodiment. Unlike the interferometer 11a of the Fourier transform spectrometer Da of the first embodiment, in the interferometer 11b of the Fourier transform spectrometer Db of the second embodiment, first measurement light does not pass through the phase compensation plate CP, but the second measurement light passes through the first phase difference plate 113. In this way, the Fourier transform spectrometer Db is provided with the first phase difference plate 113, which is an optical element constituted of e.g. a transparent substrate on at least one of the two optical paths so that the number of times of refraction of light passing through the first and second optical paths are differentiated from each other (see FIG. 11). The first light receiving section 21 photoelectrically converts the interfering light of the incident measurement light, and outputs an electrical signal indicating the output thereof to an amplifying section 22. The amplifying section 22 amplifies the electrical signal, and outputs the amplified electrical signal to an AD conversion section 23. On the other hand, the Fourier transform spectrometer Db also receives laser light having a predetermined half bandwidth emitted from the position measurement light source 31b. The laser light is incident to the interferometer 11b via the beam splitter 33, is interfered in the interferometer 11b substantially in the same manner as described above, and is received on the second light receiving section 36 via the beam splitter 34 as interfering light of the laser light. The second light receiving section 36 photoelectrically converts the interfering light of the incident laser light, and outputs an electrical signal indicating the output thereof to each of the zero-cross detecting section 37 and the envelope curve detecting section 38. The zero-cross detecting section 37 detects a zero-cross timing of the electrical signal, and outputs the detected zero-cross timing to the AD conversion section 23.

During a time when the aforementioned measurement light and laser light are respectively received in the interferometer 11b, the movable mirror 115 of the interferometer 11b is moved along the optical axis direction according to the control of the control computing section 41b.

The AD conversion section 23 performs sampling of the electrical signal from the amplifying section 22 at a zero-cross timing detected by the zero-cross detecting section 37, performs AD conversion of the sampled analog signal to a digital signal, and outputs the digital electrical signal to the spectrum computing section 411b of the control computing section 41b.

By performing the above operation, the interferogram as shown in FIG. 14B and FIG. 15 is input from the AD conversion section 23 to the spectrum computing section 411b of the control computing section 41b.

In the following, an interferogram to be generated by the Fourier transform spectrometer Db of the second embodiment is described in comparison with an interferogram to be generated by the Fourier transform spectrometer Da of the first embodiment, in which a phase difference is compensated by the phase compensation plate CP.

As described above, since the Fourier transform spectrometer Da of the first embodiment is provided with the phase compensation plate CP, phase compensation is performed. Accordingly, in the Fourier transform spectrometer Da of the first embodiment, an interferogram of interfering light of measurement light has such a profile that the initial phase difference of each of the wavelength components of the measurement light becomes zero, and as shown in FIG. 3C or FIG. 4, the center burst is relatively distinguishable and large, and the side lobe is small.

On the other hand, the Fourier transform spectrometer Db of the second embodiment is not provided with the phase compensation plate CP, but is provided with the phase difference plate 113 only on the second optical path. Specifically, the interferometer 11b of the second embodiment is a phase-difference interferometer provided with the first and second optical paths constituted of a plurality of optical elements (in the example of FIG. 10, the semitransparent mirror 112, the fixed mirror 114, and the movable mirror 115) between the incident position of measurement light to the interfering position of measurement light, and having a phase difference between the two optical paths in the aforementioned state that the optical elements are disposed in such a manner that the optical path length difference between the first and second optical paths becomes zero, assuming that the first and second optical paths are made of a same medium. In other words, the phase-difference interferometer actually has a phase difference between the first and second optical paths in a state that the movable mirror 114 is disposed at a center burst position substantially equivalent to a case that phase compensation is performed by the interferometer 11a provided with the phase compensation plate CP. As described above, in the second embodiment, the interferometer 11b is a phase-difference interferometer. Accordingly, as is obvious from the comparison between FIG. 4 and FIG. 15, the interferometer 11b is advantageous in reducing the magnitude (level) of amplitude of an interferogram, as compared with an interferogram measured by the interferometer 11a provided with the phase compensation plate CP. For instance, whereas the magnitude Y of the maximum amplitude of an interferogram measured by the interferometer 11a provided with the phase compensation plate CP is about 3,200 as shown in the diagram (C) of FIG. 4, the magnitude X of the maximum amplitude of an interferogram measured by the interferometer 11b of the second embodiment is about 1,400 (X<Y), as shown in the diagram (C) of FIG. 15.

Accordingly, in the case where these interferograms are AD converted by AD converters having the same bit number Z, the number of A/D counts assigned to a unit amplitude level is larger in the Fourier transform spectrometer Db of the second embodiment than in the Fourier transform spectrometer Da of the first embodiment. Specifically, assuming that X denotes the maximum amplitude of one or more peaks in an interferogram measured by the Fourier transform spectrometer Db of the second embodiment, and Y denotes the maximum amplitude of one or more peaks in an interferogram measured by the Fourier transform spectrometer Da of the first embodiment, X<Y. Assuming that Z is the bit number of the AD converter, the number of A/D counts assigned to a unit amplitude level is $2^Z/X > 2^Z/Y$. Thus, the number of A/D counts assigned to a unit amplitude level is larger in the Fourier transform spectrometer D of the second embodiment than in the Fourier transform spectrometer of the first embodiment. Accordingly, as compared with the Fourier transform spectrometer Da of the first embodiment, the Fourier transform spectrometer Db of the second embodiment is advantageous in assigning a relatively large number of A/D counts to an electrical signal in the vicinity of zero level $(2^Z/X > 2^Z/Y)$. Thus, the Fourier transform spectrometer Db of the second embodiment is advantageous in detecting a signal of a low level in the vicinity of zero level in an interferogram with high resolution with use of one A/D converter.

On the other hand, as described above, in the Fourier transform spectrometer Db of the second embodiment, a phase-difference interferometer is used as the interferometer 11b. Accordingly, as shown in the example of diagram (B) in FIG. 15, a center burst position may be less distinguishable. In view of the above, in the Fourier transform spectrometer Db of the second embodiment, a center burst position is obtained from an envelope curve of interfering light of laser light having a predetermined line width.

In the Fourier transform spectrometer Da of the first embodiment, monochromatic laser light is used in order to obtain a sampling timing of AD conversion by detecting a moved position of the movable mirror 115 in the interferometer 11a. As shown in the diagrams (A), (B), and (C) of FIG. 5, the light intensity of interfering light of the monochromatic laser light has a substantially constant amplitude at any position including a position where the optical path length difference is zero, and a position of a sideband signal. The position where the optical path length difference is zero corresponds to a center burst position in an interferogram, in the case where the initial phase difference of each of the wavelength components of measurement light is zero.

On the other hand, in the Fourier transform spectrometer Db of the second embodiment, laser light having a predetermined line width is used, in place of the monochromatic laser light. As shown in FIG. 16, the zero-cross timing of interfering light of laser light having a predetermined line width is substantially the same as in the case of monochromatic laser light. However, as shown in the diagrams (A), (B), and (C) of FIG. 16, an interferogram of the interfering light of the laser light having the predetermined line width has such a profile that the amplitude thereof is largest at a position where the optical path length difference is zero, and the amplitude thereof gradually decreases, as approaching toward a position of a sideband signal. Accordingly, it is possible to detect a center burst position by detecting an envelope curve of a light intensity of interfering light of laser light having a predetermine line width. More specifically, the envelope curve detecting section 38 detects an electrical signal according to a light intensity of interfering light of the laser light input from the second light receiving section 36, as an envelope curve, and outputs the detection result to the center burst position computing section 412 of the control computing section 41b. The center burst position computing section 412 detects a maximum value of the envelope curve input from the envelope curve detecting section 38, and obtains a position where the maximum value is given, as the center burst position. Then, the center burst position computing section 412 outputs the obtained center burst position to the spectrum computing section 411.

By performing the above operation, an interferogram of measurement light is input from the AD conversion section 23 to the spectrum computing section 411b, and a center burst position is input from the center burst position computing section 412.

Then, the spectrum computing section 411b generates an integrated interferogram with use of the extracting section 4111, the retrieving section 4112, and the integrating section 4113 by performing substantially the same operation as in the first embodiment, performs a Fourier transform e.g. a fast Fourier transform of the integrated interferogram of the measurement light, based on the detected center burst position, and obtains a spectrum of the measurement light. More specifically, in extracting measurement data within a predetermined range "i" from an output of the interferometer 11b, the extracting section 4111 sets the predetermined range "i" to be extracted at the present time by shifting a start position of the predetermined range "i" to be extracted at the present time according to a shift amount between a center burst position of an interferogram at the first measurement, and a center burst position of an interferogram at a measurement before the first measurement, while expanding the predetermined range "i" to be extracted at the present time according to the number of times of measurements with respect to the range "i" extracted at the first time in such a manner that at the first measurement, the predetermined range "i" is expressed by the aforementioned formula (1) (see FIG. 17A), at the (n–1)-th measurement, the predetermined range "i" is expressed by the aforementioned formula (2) (see FIG. 17B), and at the n-th measurement, the predetermined range "i" is expressed by the aforementioned formula (3) (see FIG. 17C); and extracts the measurement data within the predetermined range "i" from the output of the interferometer 11b. Then, the retrieving section 4112 retrieves measurement data having the same optical path length difference as each other by using one of the aforementioned approaches as expressed by the formulas 4 (formulas (4-1), and (4-2)), and the formulas 6 (formulas (6-1), and (6-2)) with respect to each of the measurement data groups extracted by the extracting section 4111. Then, the integrating section 4113 generates an integrated interferogram by summing up the measurement data having the same optical path length difference as each other, which has been retrieved by the retrieving section 4112, with respect to each of the measurement data groups extracted by the extracting section 4111. Then, the integrating section 4114b performs a fast Fourier transform of the integrated interferogram of the measurement light, based on the detected center burst position by the formulas 8 to 10, and obtains a spectrum of the measurement light. Then, the obtained spectrum of the measurement light is output to the output section 43.

As described above, according to the Fourier transform spectrometer Db and the Fourier transform spectroscopic method to be implemented by the Fourier transform spectrometer Db of the second embodiment, it is possible to generate interfering light of measurement light by the interferometer 11b, which is a phase-difference interferometer having a phase difference even in a state that the optical elements constituting the interferometer 11b are disposed at such a hypothetical position that the optical path length difference is zero. Accordingly, the maximum amplitude X of one or more peaks in an interferogram measured by the interferometer 11b is smaller than the maximum amplitude Y of one or more peaks in an interferogram corresponding to interfering light of measurement light generated by the phase-compensated interferometer 11a (X<Y). Therefore, in the case where an electrical signal obtained by receiving interfering light is AD converted by an AD converter whose bit number is Z, a relatively large number of A/D counts are assigned to the electrical signal in the vicinity of zero level ($2^Z/X > 2^Z/Y$). Thus, the Fourier transform spectrometer Db and the Fourier transform spectroscopic method to be implemented by the Fourier transform spectrometer Db of the second embodiment are advantageous in detecting a signal of a small level in the vicinity of zero level in an interferogram with high resolution with use of one AD converter, in the case where an AD converter is used.

Further, the Fourier transform spectrometer Db of the second embodiment satisfies the requirement: X<Y as described above. Accordingly, it is possible to use, as an amplifier of the amplifying section 22, an amplifier whose through-rate is relatively low (an operational amplifier whose following capability with respect to an input signal is relatively low). Thus, it is possible to use a low noise amplifier. Use of a low noise amplifier (LNA) as an amplifier of the amplifying section 22 is advantageous in enhancing the S/N ratio in the Fourier transform spectrometer Db of this embodiment.

Further, the Fourier transform spectrometer Db of the second embodiment is further provided with the first phase difference plate 113 on the transmitting side of the semitransparent mirror 112. This is further advantageous in increasing the phase difference between the first and second optical paths in the interferometer 11. Accordingly, the Fourier transform spectrometer Db of the second embodiment is advantageous in reducing the maximum amplitude X of one or more peaks in an interferogram, as compared with an interferogram to be measured by a phase-difference interferometer configured to generate a phase difference only by a transparent substrate of a semitransparent mirror 112, without providing a first phase difference plate 113, as will be described later with reference to the diagram (A) of FIG. 18.

Further, the Fourier transform spectrometer Db of the second embodiment is configured to detect a center burst position by detecting an envelope curve of a light intensity of interfering light of laser light having a predetermined line width. Accordingly, it is possible to configure a wave detection circuit with a simplified circuit configuration, as shown in the example of FIG. 13.

Further, in the Fourier transform spectrometer Db of the second embodiment, laser light is laser light having a predetermined line width, and a part of the configuration for detecting a position of the movable mirror 112 is used as a configuration for detecting a center burst position. More specifically, the configuration from the position measurement light source 31b to the second light receiving section 36 is used in common, and an output of the second light receiving section 36 is output to each of the zero-cross detecting section 37 and the envelope curve detecting section 38. Accordingly, the Fourier transform spectrometer Db of the second embodiment is advantageous in detecting a center burst position with a less number of circuit elements.

Further, the Fourier transform spectrometer Db of the second embodiment is provided with, as the position measurement light source 31b, a laser device which emits laser light having a predetermined line width by performing high frequency superimposition of monochromatic laser light, or a semiconductor laser which emits laser light having a predetermined line width. Accordingly, in the second embodiment, it is possible to configure the position measurement light source 31b which emits laser light having a predetermined line width with a simplified construction.

Figure 18A:
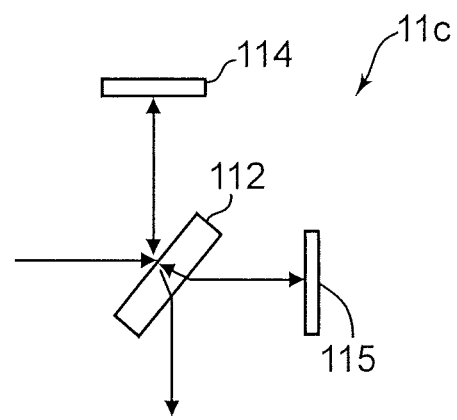
FIGS. 18A, 18B, and 18C are diagrams for describing a configuration of an interferometer, a waveform (interferogram) of interfering light of measurement light, and a waveform of interfering light of laser light from a position measurement light source according to a second aspect in the Fourier transform spectrometer of the second embodiment.
Figure 18B:
Figure 18C:
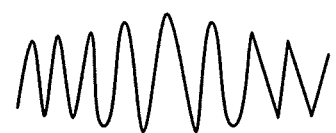
Figure 19:
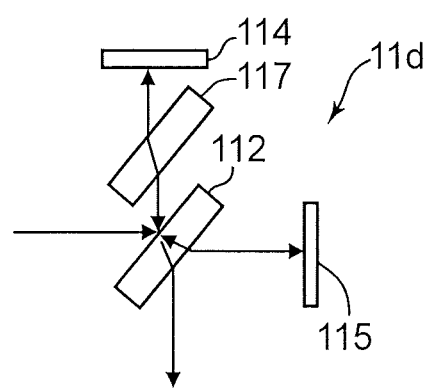
FIG. 19 is a diagram showing a configuration of an interferometer according to a third aspect in the Fourier transform spectrometer of the second embodiment.

FIGS. 18A, 18B, and 18C are diagrams for describing a configuration of an interferometer, a waveform (interferogram) of interfering light of measurement light, and a waveform of interfering light of laser light from a position measurement light source according to a second aspect in the Fourier transform spectrometer of the second embodiment. FIG. 18A shows a configuration of the interferometer according to the second aspect in the Fourier transform spectrometer of the second embodiment. FIG. 18B schematically shows a waveform (interferogram) of interfering light of measurement light. FIG. 18C schematically shows a waveform of interfering light of laser light from the position measurement light source. FIG. 19 is a diagram showing a configuration of an interferometer according to a third aspect in the Fourier transform spectrometer of the second embodiment.

In the second embodiment, as shown in FIG. 11 or FIG. 14A, there is used, as a phase-difference interferometer, the interferometer 11b (the interferometer 11b according to a first aspect of the second embodiment) having the phase difference plate 113 between the semitransparent mirror 112 and the movable mirror 115. The embodiment is not limited to the above. For instance, it is possible to use an interferometer 11c according to the second aspect of the second embodiment having the configuration shown in FIGS. 18A, 18B, and 18C, or it is possible to use an interferometer 11d according to the third aspect of the second embodiment having the configuration shown in FIG. 19.

More specifically, as described above, the semitransparent mirror 112 itself generates a phase difference because the semitransparent mirror 112 is provided with a transparent substrate. In view of the above, as shown in FIG. 18A, the interferometer 11c according to the second aspect has such a configuration that the phase difference plate 113 in the interferometer 11b according to the first aspect is excluded. Excluding the phase compensation plate CP for the phase compensation as described above referring to FIG. 3A from a Michelson interferometer having a general configuration, which is incorporated with an ordinary semitransparent mirror 112 provided with a transparent substrate in which a semitransparent mirror surface is formed on a principal plane of the transparent substrate, is advantageous in simplifying the configuration of the phase-difference interferometer. Specifically, as shown in FIG. 18A, 18B, and 18C, the interferometer 11c according to the second aspect is a Michelson interferometer provided with a semitransparent mirror 112, a fixed mirror 114, and a movable mirror 115 to be moved in the optical axis direction, wherein measurement light is separated into first measurement light and second measurement light on the semitransparent mirror 112, the first measurement light and the second measurement light are respectively incident to the fixed mirror 114 and the movable mirror 115, and the first measurement light reflected on the fixed mirror 114 and the second measurement light reflected on the movable mirror 115 are interfered with each other on the semitransparent mirror 112. The semitransparent mirror 112 is provided with a transparent substrate, and a semitransparent mirror surface formed on a principal plane of the transparent substrate.

The interferometer 11c according to the second aspect has substantially the same operations and effects as those of the interferometer 11b according to the first aspect. However, as is obvious from the comparison between FIGS. 14B and 14C, and FIGS. 18B and 18C, the interferometer 11b according to the first aspect is provided with the phase difference plate 113. Accordingly, the interferometer 11b according to the first aspect is advantageous in making the maximum amplitude of interfering light of measurement light small, and in making a change in the amplitude of an envelope curve of interfering light of laser light large, as compared with the interferometer 11c according to the second aspect. Thus, the interferometer 11b according to the first aspect is advantageous, in the case where the interferometer 11b according to the first aspect and the interferometer 11c according to the second aspect are compared with each other.

Further, as shown in FIG. 19, the interferometer 11d according to the third aspect is a Michelson interferometer provided with a semitransparent mirror 112, a fixed mirror 114, and a movable mirror 115 to be moved in the optical axis direction, wherein measurement light is separated into first measurement light and second measurement light on the semitransparent mirror 112, the first measurement light and the second measurement light are respectively incident to the fixed mirror 114 and the movable mirror 115, and the first measurement light reflected on the fixed mirror 114 and the second measurement light reflected on the movable mirror 115 are interfered with each other on the semitransparent mirror 112. The semitransparent mirror 112 is provided with a transparent substrate, and a semitransparent mirror surface formed on a principal plane of the transparent substrate. The interferometer 11d according to the third aspect is further provided with a second phase difference plate 117 disposed on the reflection side of the semitransparent mirror 112, in the case where the measurement light is separated into the first measurement light and the second measurement light on the semitransparent mirror 112. The second phase difference plate 117 generates a phase difference different from the phase difference generated on the semitransparent mirror 112. For instance, the second phase difference plate 117 may have a thickness substantially the same as the thickness of the transparent substrate of the semitransparent mirror 112, and may be made of a material having a refractive index (refractive index characteristics) different from the refractive index of the transparent substrate of the semitransparent mirror 112. Further, for instance, the second phase difference plate 117 may have a thickness different from the thickness of the transparent substrate of the semitransparent mirror 112, and may be made of a material (e.g. the same material as the material of the transparent substrate of the semitransparent mirror 112) having substantially the same refractive index (refractive index characteristics) as the refractive index of the transparent substrate of the semitransparent mirror 112.

The thus configured interferometer 11*d* according to the third aspect is further provided with the second phase difference plate 117 on the reflection side of the semitransparent mirror 112. Accordingly, as compared with the interferometer 11*c* according to the second aspect having the configuration shown in FIG. 18A, the interferometer 11*d* according to the third aspect is advantageous in making the phase difference between the first and second optical paths large.

An interferometer 11*e* (not shown) according to a fourth aspect of the second embodiment may be configured by providing the second phase difference plate 117 in the interferometer 11*b* according to the first aspect having the configuration shown in FIG. 11 and FIG. 14A.

Figure 21:
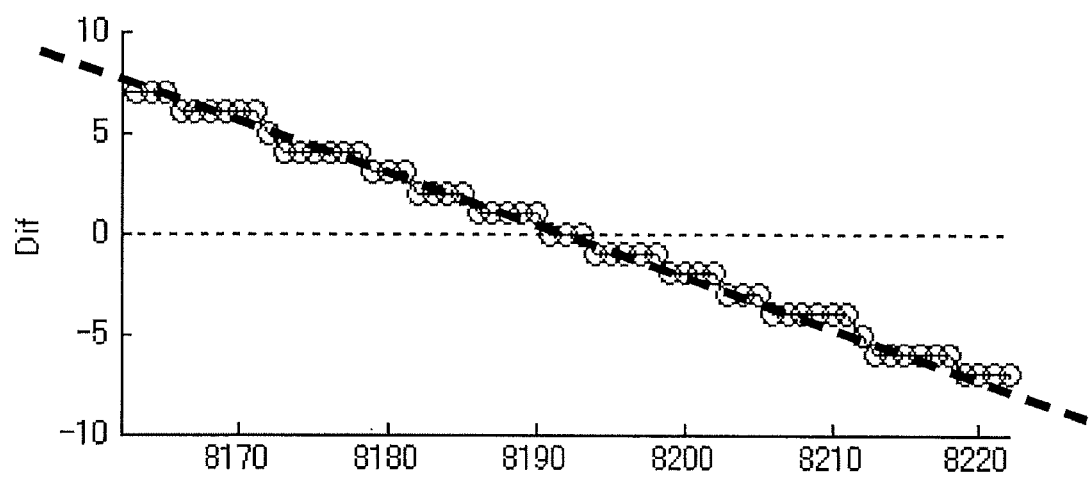
FIG. 21 is a diagram for describing a method for obtaining a center burst position, based on an envelope curve of interfering light of laser light according to a third aspect.

FIGS. 20A and 20B are diagrams for describing a method for obtaining a center burst position, based on an envelope curve of interfering light of laser light according to a second aspect. FIG. 20A shows the envelope curve, and FIG. 20B shows a difference waveform of the envelope curve. FIG. 21 is a diagram for describing a method for obtaining a center burst position, based on an envelope curve of interfering light of laser light according to a third aspect. In FIGS. 20A, 20B, and 21, the horizontal axis indicates an optical path length difference (position of the movable mirror 115), and the vertical axis indicates a level.

Further, in the second embodiment, the center burst position calculating section 412 may detect a maximum value of an envelope curve input from the envelope curve detecting section 38 at a point at which the amplitude value (level) of the envelope curve changes from an increase to a decrease, as the movable mirror 112 is moved (according to a change in the optical path length difference). However, as shown in FIG. 20A, in the case where the envelope curve relatively moderately changes in the vicinity of the maximum value, as the movable mirror 112 is moved (according to a change in the optical path length difference), it is not easy to detect the point with precision. In view of the above, the center burst position computing section 412 may detect, as the center burst position, a position at which a maximum value of an envelope curve detected by the envelope curve detecting section 38 is given, based on difference information on the envelope curve detected by the envelope curve detecting section 38.

More specifically, the center burst position computing section 412 obtains a difference between two points on an envelope curve at a certain time interval. For instance, obtaining a difference between two points on the envelope curve shown in FIG. 20A yields a difference graph shown in FIG. 20B, as the difference information. In the difference graph, a zero-cross point at which the difference value changes from a plus value to a minus value corresponds to a position at which a maximum value is given. Accordingly, the center burst position computing section 412 may obtain a zero-cross point at which the difference value changes from a plus value to a minus value in the difference graph, and may define the zero-cross point as the center burst position.

In this example, as the time interval with which a difference is obtained increases, the difference value increases, and it is possible to detect a zero-cross point with enhanced precision. Accordingly, it is possible to detect a center burst position with enhanced precision.

Further, in the case where the time interval cannot be made large because of the constraint of the storage capacity of a storage element which stores measurement results on an envelope curve, or in the case where the resolution is low because the bit number Z of the AD conversion section 23 is small in obtaining such a difference, as shown in FIG. 21, the difference may have a step portion in the vicinity of the zero-cross point. In such a case, a difference graph in the vicinity of the zero-cross point may be linearly approximated by a least square method, and a center burst position may be obtained by obtaining the zero-cross point of the approximate straight line.

With use of the difference information on the envelope curve as described above, the center burst position computing section 412 in the Fourier transform spectrometer Db of the second embodiment is capable of detecting a position at which a maximum value of the envelope curve is given with enhanced precision, and even in the case where the maximum value of the envelope curve is less discernible because a change of the envelope curve is moderate, it is possible to detect a position at which a maximum value of the envelope curve is given.

The specification discloses the aforementioned configurations. The following is a summary of the primary configurations of the embodiments.

A Fourier transform spectrometer according to an aspect is provided with an interferometer to which measurement light to be measured is incident, the interferometer including a plurality of optical elements which constitute two optical paths from an incident position of the measurement light to an interfering position of the measurement light, the plurality of the optical elements including an optical path length difference forming optical element which generates an optical path length difference between the two optical paths; and a spectrum computing section which obtains a spectrum of the measurement light by subjecting an integrated interferogram obtained by integrating a plurality of interferograms of the measurement light generated by the interferometer to a Fourier transform. The spectrum computing section includes an extracting section, in extracting an output within a predetermined range from an output of the interferometer, which sets the predetermined range to be extracted according to positioning information of a center burst in an interferogram of the measurement light measured at a time before measurement of an interferogram of the measurement light at a present time, and which extracts an output within the predetermined range from the output of the interferometer; a retrieving section which retrieves measurement data having a same optical path length difference as each other from respective outputs within respective predetermined ranges extracted by the extracting section for integrating the plurality of the interferograms of the measurement light; an integrating section which generates the integrated interferogram by summing up the measurement data having the same optical path length difference as each other retrieved by the retrieving section from the respective outputs within the respective predetermined ranges extracted by the extracting section for integrating the plurality of the interferograms of the measurement light; and a computing section which obtains the spectrum of the measurement light by subjecting the integrated interferogram generated by the integrating section to the Fourier transform.

A Fourier transform spectroscopic method according to another aspect is a Fourier transform spectroscopic method to be implemented by a Fourier transform spectrometer provided with an interferometer to which measurement light to be measured is incident, the interferometer including a plurality of optical elements which constitute two optical paths from an incident position of the measurement light to an interfering position of the measurement light, the plurality of the optical elements including an optical path length difference forming optical element which generates an optical path length difference between the two optical paths; and a spectrum computing section which obtains a spectrum of the measurement light by subjecting an integrated interferogram obtained by integrating a plurality of interferograms of the measurement light generated by the interferometer to a Fourier transform. The method includes, in obtaining the spectrum of the measurement light, an extracting step of, in extracting an output within a predetermined range from an output of the interferometer, setting the predetermined range to be extracted according to positioning information of a center burst in an interferogram of the measurement light measured at a time before measurement of an interferogram of the measurement light at a present time, and extracting an output within the predetermined range from the output of the interferometer; a retrieving step of retrieving measurement data having the same optical path length difference as each other from respective outputs within respective predetermined ranges extracted by the extracting section for integrating the plurality of the interferograms of the measurement light; an integrating step of generating the integrated interferogram by summing up the measurement data having the same optical path length difference as each other retrieved in the retrieving step from the respective outputs within the respective predetermined ranges extracted in the extracting step for integrating the plurality of the interferograms of the measurement light; and a computing step of obtaining the spectrum of the measurement light by subjecting the integrated interferogram generated in the integrating step to the Fourier transform.

According to the Fourier transform spectrometer and the Fourier transform spectroscopic method, in extracting an output within a predetermined range from an output of the interferometer, the predetermined range to be extracted is set according to positioning information of a center burst in an interferogram of the measurement light measured at a time before measurement of an interferogram of the measurement light at the present time. According to the Fourier transform spectrometer and the Fourier transform spectroscopic method having the above configuration, it is possible to appropriately extract measurement data within a range which completely covers the entirety of interferograms, because the positioning information obtained at a time before the present measurement is included. This is advantageous in appropriately integrating the interferograms.

Further, in the Fourier transform spectrometer having the above configuration, the positioning information to be used by the extracting section may be a shift amount between a center burst position of an interferogram at a first measurement, and a center burst position of an interferogram at a measurement before the first measurement.

In the thus configured Fourier transform spectrometer, there is used, as the positioning information, a shift amount between a center burst position of an interferogram at a first measurement, and a center burst position of an interferogram at a measurement before the first measurement. Accordingly, the Fourier transform spectrometer is advantageous in appropriately extracting measurement data within a range which completely covers the entirety of interferograms, in the case where a shift amount between an interferogram measured at a time preceding the present measurement, and an interferogram measured at the present time is small. Thus, it is possible to appropriately integrate the interferograms.

Further, in the Fourier transform spectrometer having any one of the above configurations, the retrieving section may retrieve the measurement data having the same optical path length difference as each other by obtaining a maximum value having cross correlation from an output within a predetermined range extracted by the extracting section at a first measurement, and from an output within a predetermined range extracted by the extracting section at an n-th measurement (where n is a positive integer of 2 or larger).

In the thus configured Fourier transform spectrometer, it is possible to accurately retrieve measurement data having the same optical path length difference as each other, because the measurement data having the same optical path length difference as each other can be retrieved by using cross correlation. Thus, the Fourier transform spectrometer having the above configuration is advantageous in appropriately integrating the interferograms.

Further, in the Fourier transform spectrometer having any one of the above configurations, the retrieving section may retrieve the measurement data having the same optical path length difference as each other by obtaining a minimum value in a sum of squares of differences regarding measurement points from an output within a predetermined range extracted by the extracting section at a first measurement, and from an output within a predetermined range extracted by the extracting section at an n-th measurement (where n is a positive integer of 2 or larger).

In the thus configured Fourier transform spectrometer, measurement data having the same optical path length difference as each other is retrieved by using a sum of squares of differences. Accordingly, it is possible to accurately retrieve the measurement data having the same optical path length difference as each other. Thus, the Fourier transform spectrometer having the above configuration is advantageous in appropriately integrating the interferograms.

Further, in the Fourier transform spectrometer having any one of the above configurations, the retrieving section may retrieve the measurement data having the same optical path length difference as each other by obtaining a minimum value in a sum of absolute values of differences regarding measurement points from an output within a predetermined range extracted by the extracting section at a first measurement, and from an output within a predetermined range extracted by the extracting section at an n-th measurement (where n is a positive integer of 2 or larger).

In the thus configured Fourier transform spectrometer, measurement data having the same optical path length difference as each other is retrieved by using a sum of absolute values of differences. Accordingly, it is possible to accurately retrieve the measurement data having the same optical path length difference as each other by simplified information processing.

Further, the Fourier transform spectrometer having any one of the above configurations may further include a center burst position detecting section which detects a center burst position in an interferogram, in a case where an initial phase difference in each of wavelength components of the measurement light is zero. The interferometer is a phase-difference interferometer actually having a phase difference between the two optical paths, in a case where the plurality of the optical elements are disposed in such a manner that the optical path length difference between the two optical paths becomes zero, assuming that the two optical paths are made of a same medium. The computing section in the spectrum computing section obtains the spectrum of the measurement light by subjecting the integrated interferogram to the Fourier transform, based on the center burst position detected by the center burst position detecting section.

In the thus configured Fourier transform spectrometer, interfering light of measurement light is generated by a phase-difference spectrometer. Accordingly, the maximum amplitude X of one or more peaks in an interferogram measured by the interferometer is smaller than the maximum amplitude Y of one or more peaks in an interferogram corresponding to interfering light of measurement light generated by an ordinary phase-compensated interferometer (X<Y). Therefore, in the case where an electrical signal obtained by receiving interfering light is AD converted from an analog signal to a digital signal by an analog-to-digital converter (AD converter) whose bit number is Z, a relatively large number of A/D counts are assigned to the electrical signal in the vicinity of zero level ($2^Z/X>2^Z/Y$). Thus, the Fourier transform spectrometer is advantageous in detecting a signal of a small level in the vicinity of zero level in an interferogram with high resolution with use of one AD converter, in the case where an AD converter is used. As described above, the Fourier transform spectrometer is advantageous in accurately obtaining measurement data having the same optical path length difference as each other, and accordingly, is advantageous in appropriately integrating the interferograms.

This application is based on Japanese Patent Application No. 2011-83769 filed on Apr. 5,2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

According to the invention, it is possible to provide a Fourier transform spectrometer and a Fourier transform spectrometric method.

The invention claimed is:

1. A Fourier transform spectrometer, comprising:
    an interferometer to which measurement light to be measured is incident, the interferometer comprising a plurality of optical elements which constitute two optical paths from an incident position of the measurement light to an interfering position of the measurement light, the plurality of the optical elements comprising an optical path length difference forming optical element structured to generate an optical path length difference between the two optical paths;
    a spectrum computing section structured to obtain a spectrum of the measurement light by subjecting an integrated interferogram obtained by integrating a plurality of interferograms of the measurement light generated by the interferometer to a Fourier transform; and
    a position detecting section comprising:
        a position measuring light source structured to emit laser light; and
        a light receiving part structured to receive interfering light of the laser light obtained by causing the laser light emitted from the position measuring light source to be incident onto the interferometer to thereby output a light intensity of the interfering light;
    wherein the position detecting section is structured to detect a position of the optical path length difference forming optical element on the basis of the light intensity of the interfering light of the laser light output from the light receiving part; and
    the optical path length difference forming optical element is structured to move in an optical axis direction by a resonant vibration in such a manner that an output from the light receiving part repeats a sinusoidal wave pattern in order to generate a plurality of interferograms of the measurement light;
    wherein the spectrum computing section comprising:
        an extracting section that, in extracting an output within a predetermined range from an output of the interferometer, is structured to set the predetermined range to be extracted according to positioning information of a center burst based on the position of the light path length difference forming optical element detected by the position detecting section in an interferogram of the measurement light measured at a time before measurement of an interferogram of the measurement light at a present time, and is structured to extract an output within the predetermined range from the output of the interferometer, for a measurement of each of the plurality of interferograms of the measurement light;
        a retrieving section structured to retrieve measurement data having a same optical path length difference as each other from respective outputs within respective predetermined ranges extracted by the extracting section for integrating the plurality of the interferograms of the measurement light;
        an integrating section structured to generate the integrated interferogram by summing up the measurement data having the same optical path length difference as each other retrieved by the retrieving section from the respective outputs within the respective predetermined ranges extracted by the extracting section for integrating the plurality of the interferograms of the measurement light; and
        a computing section structured to obtain the spectrum of the measurement light by subjecting the integrated interferogram generated by the integrating section to the Fourier transform.

2. The Fourier transform spectrometer according to claim 1, wherein
    the positioning information to be used by the extracting section is a shift amount between a center burst position of an interferogram at a first measurement among measurements of the plurality of interferograms of the measurement light, and a center burst position of an interferogram at a measurement before the first measurement.

3. The Fourier transform spectrometer according to claim 1, wherein
    the retrieving section is structured to retrieve the measurement data having the same optical path length difference as each other by obtaining a maximum value having cross correlation from an output within a predetermined range extracted by the extracting section at a first measurement among measurements of the plurality of interferograms of the measurement light, and from an output within a predetermined range extracted by the extracting section at an n-th measurement (where n is a positive integer of 2 or larger).

4. The Fourier transform spectrometer according to claim 1, wherein
the retrieving section is structured to retrieve the measurement data having the same optical path length difference as each other by obtaining a minimum value in a sum of squares of differences regarding measurement points from an output within a predetermined range extracted by the extracting section at a first measurement among measurements of the plurality of interferograms of the measurement light, and from an output within a predetermined range extracted by the extracting section at an n-th measurement (where n is a positive integer of 2 or larger).

5. The Fourier transform spectrometer according to claim 1, wherein
the retrieving section is structured to retrieve the measurement data having the same optical path length difference as each other by obtaining a minimum value in a sum of absolute values of differences regarding measurement points from an output within a predetermined range extracted by the extracting section at a first measurement among measurements of the plurality of interferograms of the measurement light, and from an output within a predetermined range extracted by the extracting section at an n-th measurement (where n is a positive integer of 2 or larger).

6. The Fourier transform spectrometer according to claim 1, further comprising:
a center burst position detecting section structured to detect a center burst position in an interferogram, in a case where an initial phase difference in each of wavelength components of the measurement light is zero on the basis of the output from the light receiving part, wherein
the laser light emitted from the position measuring light source is laser light having a predetermined line width;
the interferometer is a phase-difference interferometer actually having a phase difference between the two optical paths, in a case where the plurality of the optical elements are disposed in such a manner that the optical path length difference between the two optical paths becomes zero, assuming that the two optical paths are made of a same medium, and
the computing section in the spectrum computing section is structured to obtain the spectrum of the measurement light by subjecting the integrated interferogram to the Fourier transform, based on the center burst position detected by the center burst position detecting section.

7. The Fourier transform spectrometer according to claim 1, wherein the predetermined range to be extracted satisfies the following equation:

$$\left(\left(I_0 + k_0(n-1) - \frac{nh+nr}{2}\right) \leq i < \left(I_0 + k_0(n-1) + \frac{nh+nr}{2}\right)\right);$$

wherein, i is the predetermined range to be extracted, $I_0$ denotes a position where the optical path length difference is zero, $k_0(n-1)$ denotes a shift amount between a center burst position of an interferogram at a first measurement among measurements of the plurality of interferograms of the measurement light and a center burst position of an interferogram at a measurement before the first measurement, and (nh+nr) denotes the number of data points to be extracted at the n-th measurement.

8. A Fourier transform spectroscopic method to be implemented by a Fourier transform spectrometer provided with an interferometer to which measurement light to be measured is incident, the interferometer comprising a plurality of optical elements which constitute two optical paths from an incident position of the measurement light to an interfering position of the measurement light, the plurality of the optical elements comprising an optical path length difference forming optical element which generates an optical path length difference between the two optical paths; a spectrum computing section which obtains a spectrum of the measurement light by subjecting an integrated interferogram obtained by integrating a plurality of interferograms of the measurement light generated by the interferometer to a Fourier transform; and a position detecting section which comprises a position measuring light source for emitting laser light, and a light receiving part for receiving interfering light of the laser light obtained by causing the laser light emitted from the position measuring light source to be incident onto the interferometer to thereby output a light intensity of the interfering light, the position detecting section detecting a position of the optical path length difference forming optical element on the basis of the light intensity of the interfering light of the laser light output from the light receiving part, the optical path length difference forming optical element moving in an optical axis direction a resonant vibration in such a manner that an output from the light receiving part repeats a sinusoidal wave pattern in order to generate a plurality of interferograms of the measurement light, the method comprising, in obtaining the spectrum of the measurement light:
in extracting an output within a predetermined range from an output of the interferometer, setting the predetermined range to be extracted according to positioning information of a center burst based on the position of the light path length difference forming optical element detected by the position detecting section in an interferogram of the measurement light measured at a time before measurement of an interferogram of the measurement light at a present time, and extracting an output within the predetermined range from the output of the interferometer, for a measurement of each of the plurality of interferograms of the measurement light;
retrieving measurement data having a same optical path length difference as each other from respective outputs within respective predetermined ranges extracted by the extracting section for integrating the plurality of interferograms of the measurement light;
generating the integrated interferogram by summing up the measurement data having the same optical path length difference as each other retrieved in the retrieving measurement data from the respective outputs within the respective predetermined ranges extracted in the extracting an output for integrating the plurality of interferograms of the measurement light; and
obtaining the spectrum of the measurement light by subjecting the integrated interferogram generated in the generating the integrated interferogram to the Fourier transform.

9. The Fourier transform spectroscopic method according to claim 8, wherein the predetermined range to be extracted satisfies the following equation:

$$\left(\left(I_0 + k_0(n-1) - \frac{nh+nr}{2}\right) \le i < \left(I_0 + k_0(n-1) + \frac{nh+nr}{2}\right)\right);$$

wherein, i is the predetermined range to be extracted, $I_0$ denotes a position where the optical path length difference is zero, $k_0(n-1)$ denotes a shift amount between a center burst position of an interferogram at a first measurement among measurements of the plurality of interferograms of the measurement light and a center burst position of an interferogram at a measurement before the first measurement, and (nh+nr) denotes the number of data points to be extracted at the n-th measurement.

10. A Fourier transform spectrometer, comprising:
an interferometer to which measurement light to be measured is incident, the interferometer comprising a plurality of optical elements which constitute two optical paths from an incident position of the measurement light to an interfering positon of the measurement light, and resonantly vibrating, the plurality of the optical elements comprising an optical path length difference forming optical element which generates an optical path length difference between the two optical paths:
a spectrum computing section structured to obtain a spectrum of the measurement light by subjecting an integrated interfergram obtained by integrating a plurality of interferograms of the measurement light generated by the interferometer to a Fourier transform; and
a position detecting section structured to detect a position of the optical path length difference forming optical element on the basis of the light intensity of the interfering light of the laser light obtained by causing the laser light to be incident to the interferometer; wherein
the spectrum computing section comprising:
an extracting section that, in extracting an output within a predetermined range from an output of the interferometer from the interferogram during the measurement of the measurement light, is structured to set the predetermined range to be extracted at a real time according to positioning information of a center burst based on the position of the light path length difference detected by the position detecting section in an interferogram of the measurement light measured at a time before measurement of an interferogram of the measurement light at a present time, and is structured to extract an output within the predetermined range from the output of the interferometer;
a retrieving section structured to retrieve measurement data having a same optical path length difference as each other from respective outputs within respective predetermined ranges extracted by the extracting section for integrating the plurality of interferograms of the measurement light;
an integrating section structured to generate the integrated interferogram by summing up the measurement data having the same optical path length difference as each other retrieved by the retrieving section from the respective outputs within the respective predetermined ranges extracted by the extracting section for integrating the plurality of interferograms of the measurement light; and
a computing section structured to obtain the spectrum of the measurement light by subjecting the integrated interferogram generated by the integrating section to the Fourier transform.

11. The Fourier transform spectrometer according to claim 10, wherein the predetermined range to be extracted satisfies the following equation:

$$\left(\left(I_0 + k_0(n-1) - \frac{nh+nr}{2}\right) \le i < \left(I_0 + k_0(n-1) + \frac{nh+nr}{2}\right)\right);$$

wherein, i is the predetermined range to be extracted, $I_0$ denotes a position where the optical path length difference is zero, $k_0(n-1)$ denotes a shift amount between a center burst position of an interferogram at a first measurement among measurements of the plurality of interferograms of the measurement light and a center burst position of an interferogram at a measurement before the first measurement, and (nh+nr) denotes the number of data points to be extracted at the n-th measurement.

* * * * *